(12) United States Patent
Narukawa et al.

(10) Patent No.: US 7,413,073 B2
(45) Date of Patent: Aug. 19, 2008

(54) PIEZO-DRIVEN PARTS FEEDER

(75) Inventors: Shuuichi Narukawa, Mie (JP);
Tetsuyuki Kimura, Mie (JP)

(73) Assignee: Shinko Electric Co., Ltd., Tokyo (JP)

( * ) Notice: Subject to any disclaimer, the term of this patent is extended or adjusted under 35 U.S.C. 154(b) by 0 days.

(21) Appl. No.: 11/610,875

(22) Filed: Dec. 14, 2006

(65) Prior Publication Data

US 2007/0090270 A1      Apr. 26, 2007

Related U.S. Application Data

(63) Continuation of application No. 10/542,100, filed as application No. PCT/JP2004/000349 on Jan. 14, 2004, now Pat. No. 7,182,200.

(30) Foreign Application Priority Data

Jan. 14, 2003      (JP)      ............... 2003-005413

(51) Int. Cl.
*B65G 27/06*      (2006.01)
(52) U.S. Cl. .................. 198/758; 198/763; 198/766
(58) Field of Classification Search .............. 198/752.1, 198/758, 759, 760, 761, 766, 763, 769; 310/310, 310/328; 328/310, 331
See application file for complete search history.

(56) References Cited

U.S. PATENT DOCUMENTS

| | | |
|---|---|---|
| 4,795,025 A | 1/1989 | Doke et al. |
| 5,472,079 A | 12/1995 | Yagi et al. |
| 6,753,640 B2 | 6/2004 | Kato et al. |
| 6,782,992 B2 | 8/2004 | Mimura et al. |

FOREIGN PATENT DOCUMENTS

| | | |
|---|---|---|
| CN | 1380234 A | 11/2002 |
| JP | 62-4120 | 1/1987 |
| JP | 62-205911 | 9/1987 |
| JP | 62-218307 | 9/1987 |
| JP | 124920/1990 | 10/1990 |
| JP | 3-106711 | 5/1991 |
| JP | 11-130229 | 5/1999 |
| JP | 2002-302231 | 10/2002 |
| TW | 463805 | 11/2001 |

*Primary Examiner*—James R Bidwell
(74) *Attorney, Agent, or Firm*—Oblon, Spivak, McClelland, Maier & Neustadt, P.C.

(57) ABSTRACT

A moving table supports a parts conveying member. A fixed table is disposed below the moving table and supports the moving table so as to freely vibrate the moving table through a vibration generator. The vibration generator includes a first elastic member and a piezoelectric element mounted to the first elastic member. One end of the first elastic member is fixed to the moving table and the other end is fixed to the fixed table. A support member includes a second elastic member. One of the second elastic member is fixed to the moving table and the other end member is fixed to the fixed table. Accordingly, the piezo-driven parts feeder can be reduced in height, the stress that acts on the vibration generator can be restricted, sufficient amplitude can be ensured and the stress on the vibration generator can be restricted even during high-frequency driving, and the replacement of the vibration generator and the change and control of the resonance frequency can easily be performed.

6 Claims, 18 Drawing Sheets

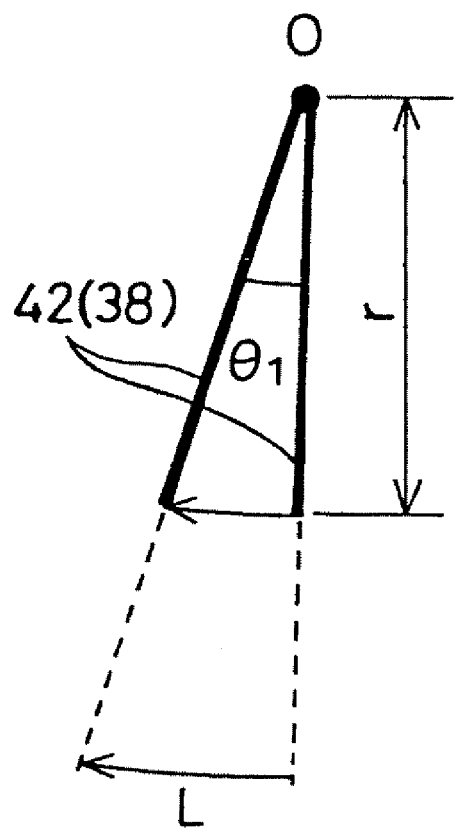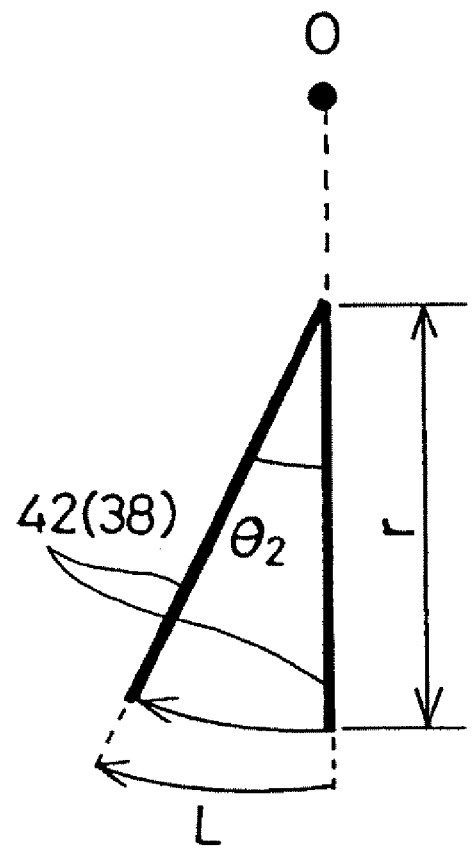
FIG. 10 (a)        FIG. 10 (b)

PIEZO-DRIVEN PARTS FEEDER

BACKGROUND OF THE INVENTION

1. Technical Field of the Invention

The present invention relates to a piezo-driven parts feeder for conveying parts in alignment by generating vibration to a parts conveying member having a parts conveying track with a vibration generator including an elastic member having a piezoelectric element mounted thereto.

2. Description of the Prior Art

Piezo-driven parts feeders are well known which convey parts in alignment by generating vibration to a parts conveying member including a parts conveying track with a vibration generator having a piezoelectric element mounted thereto. For example, ones disclosed in JP-A-62-4118 and JP-A-9-110133 are known. The piezo-driven parts feeder described in JP-A-62-4118 aims to increase the amplitude of vibration applied to a parts conveying member by connecting an elastic plate (elastic member) of a vibrator (vibration generator) and a conveyer (parts conveying member) together with a connecting plate having a Young's modulus lower than that of the elastic plate (refer to FIG. 16). The piezo-driven parts feeder described in JP-A-9-110133 aims to decrease the height of the parts feeder by laterally arranging a vibrator (vibration generator) having a piezoelectric element bonded to an elastic plate (elastic member) (refer to FIG. 17).

With the piezo-driven parts feeder described in JP-A-62-4118, however, to achieve high-frequency resonance, the spring rigidity of the connecting plate must be increased depending on a desired resonance frequency. Therefore, it is necessary to increase the thickness of the connecting plate or to decrease the effective length. As a result, the effects of an increase in amplitude will be decreased. The spring rigidity of the elastic plate of the vibrator is also increased together with the connecting plate, increasing a stress on the elastic plate having the piezoelectric element, which is not preferable. Also, since the connecting plate and the elastic plate are arranged in series, the parts feeder is also increased in height. Furthermore, when the connecting plate is replaced for the purpose of changing resonance frequency, the elastic plate must also be replaced, not only taking a complicated labor for reassembly but also involving a great difficulty in the works of mounting the short elastic plate and the connecting plate, carrying out the setting of frequency, and fine adjustment of a mounting angle (vibration angle). During the replacement, a large load is applied to a connecting plate and a vibrator that are not being replaced, having a tendency for the connecting plate and so on to cause plastic deformation. With such a structure, the static load of the conveyor acts as a bending load directly on the vibrator, thus applying a load on the piezoelectric element.

With the piezo-driven parts feeder described in JP-A-9-110133, an elastic plate having a piezoelectric element bonded thereto is arranged linearly from the center of the parts feeder outwards (radially). Accordingly, when a vibrated body for a conveyor (moving table) rotates, a tensile stress is applied to the elastic plate because the elastic-plate fixed position is displaced from the rotation center of the vibrated body for a conveyor (refer to FIG. 17). FIG. 18 schematically illustrates the force applied to the elastic plate during the vibration of the parts feeder. As shown in the drawing, when the vibrator vibrates, the end of the elastic body mounted to the vibrated body for a conveyor through a vertical connecting member is going to shift from the point A to the point B' with the point O' that is the mounting position of the elastic body to the fixed side as the center. At that time, the point A on the vibrated body for a conveyor above the position at which the end of the elastic plate is mounted is going to shift to the point B with the point O that is the center of the vibrated body for a conveyor as the center. Accordingly, a radial tensile stress occurs in the elastic body having the piezoelectric element bonded thereto. Also, the elastic body is bent in S-shape in practice, causing a greater stress. Consequently, with the piezo-driven parts feeder described in JP-A-9-110133, the elastic member having the piezoelectric element tends to be subjected to an excess tensile strength, so that also the piezoelectric element is subjected to a load, thus being reduced in life, and power is wasted, thus reducing efficiency.

SUMMARY OF THE INVENTION

The present invention has been made in view of the above-described situations. Accordingly, it is an object of the invention to provide a piezo-driven parts feeder which can be reduced in height, in which the stress that acts on a vibration generator can be restricted, sufficient amplitude can be ensured and the stress on the vibration generator can be restricted even during high-frequency driving, and the replacement of the vibration generator and the change and control of the resonance frequency can easily be performed.

According to an aspect of the invention, a piezo-driven parts feeder is provided that conveys parts by generating vibration with a vibration generator including an elastic member having a piezoelectric element mounted thereto to align the parts. The piezo-driven parts feeder includes: a moving table having or supporting the parts conveying member; a fixed table disposed below the moving table for supporting the moving table so as to freely vibrate the moving table through the vibration generator; the vibration generator including a first elastic member and a piezoelectric element mounted to the first elastic member, one end of the first elastic member being fixed to the moving table and the other end of the first elastic member being fixed to the fixed table; and a support member including a second elastic member different from the first elastic member, one of the second elastic member being fixed to the moving table and the other end of the second elastic member being fixed to the fixed table.

With such a structure, the moving table is supported by the fixed table through the separately mounted vibration generator and support member. Thus, the height of the piezo-driven parts feeder can be decreased by adjusting the respective heights of the vibration generator and the support member and setting them. A bending load due to the static load of the moving table can be dispersed, so that the load that acts on the piezoelectric element mounted to the first elastic member can be restricted. Since the limitation to the mounting position of the vibration generator is low, an excess tensile stress is also prevented from occurring at the first elastic member.

Since the vibration generator and the support member are mounted separately, a high resonance frequency can be achieved by adjusting the spring constants such that the spring constant of the first elastic member is set small and the spring constant of the second elastic member of the support member is combined therewith. Accordingly, sufficient amplitude can be ensured and so the stress to the vibration generator can be restricted even during high-frequency driving.

The first elastic member and the second elastic member can easily be replaced separately, so that a damage to an elastic member that is not being replaced can be prevented during the replacement. The resonance frequency can easily be changed by changing the number and the spring constants of the second elastic members of the support member. The spring constants of the first elastic member and the second elastic member can be finely adjusted by combining them to a desired resonance frequency.

Consequently, a piezo-driven parts feeder can be provided which can be reduced in height, in which the stress that acts on the vibration generator can be restricted, sufficient amplitude can be ensured and the stress on the vibration generator can be restricted even during high-frequency driving, and the replacement of the vibration generator and the change and control of the resonance frequency can easily be performed.

The above and other objects, features, and advantages of the present invention will be more clearly understood with reference to the accompanying drawings and the following description.

BRIEF DESCRIPTION OF THE DRAWINGS

FIGS. 10A and 10B are schematic diagrams illustrating the displacement of the piezoelectric spring due to the difference of the mounting position of the piezoelectric spring to a fixed table in the piezo-driven parts feeder of FIG. 6;

DETAILED DESCRIPTION OF THE PREFERRED EMBODIMENTS

Embodiments of the present invention will be described hereinafter with reference to the drawings. However, it is to be understood that only preferred embodiments of the invention will be described for the convenience of description and the invention is not limited thereto.

The present invention relates to a piezo-driven parts feeder for conveying parts to the subsequent process in alignment by generating vibration to a parts conveying member (a trough, a bowl and so on) having a parts conveying track with a vibration generator including an elastic member (a leaf spring or the like) having a piezoelectric element mounted thereto, which has wide application.

First Embodiment

Figure 1:
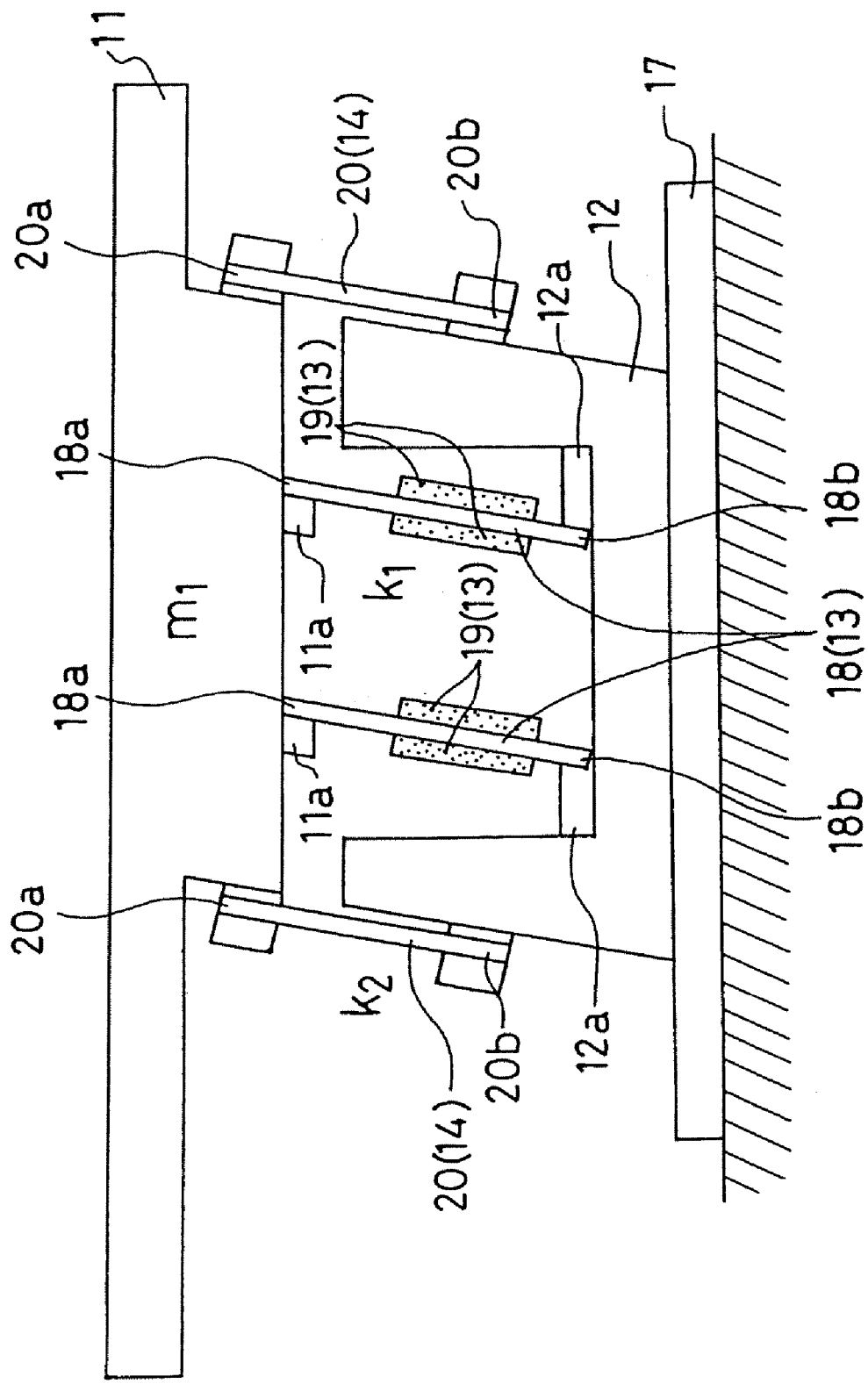
FIG. 1 is a schematic diagram illustrating a piezo-driven parts feeder according to a first embodiment of the present invention.
Figure 2:
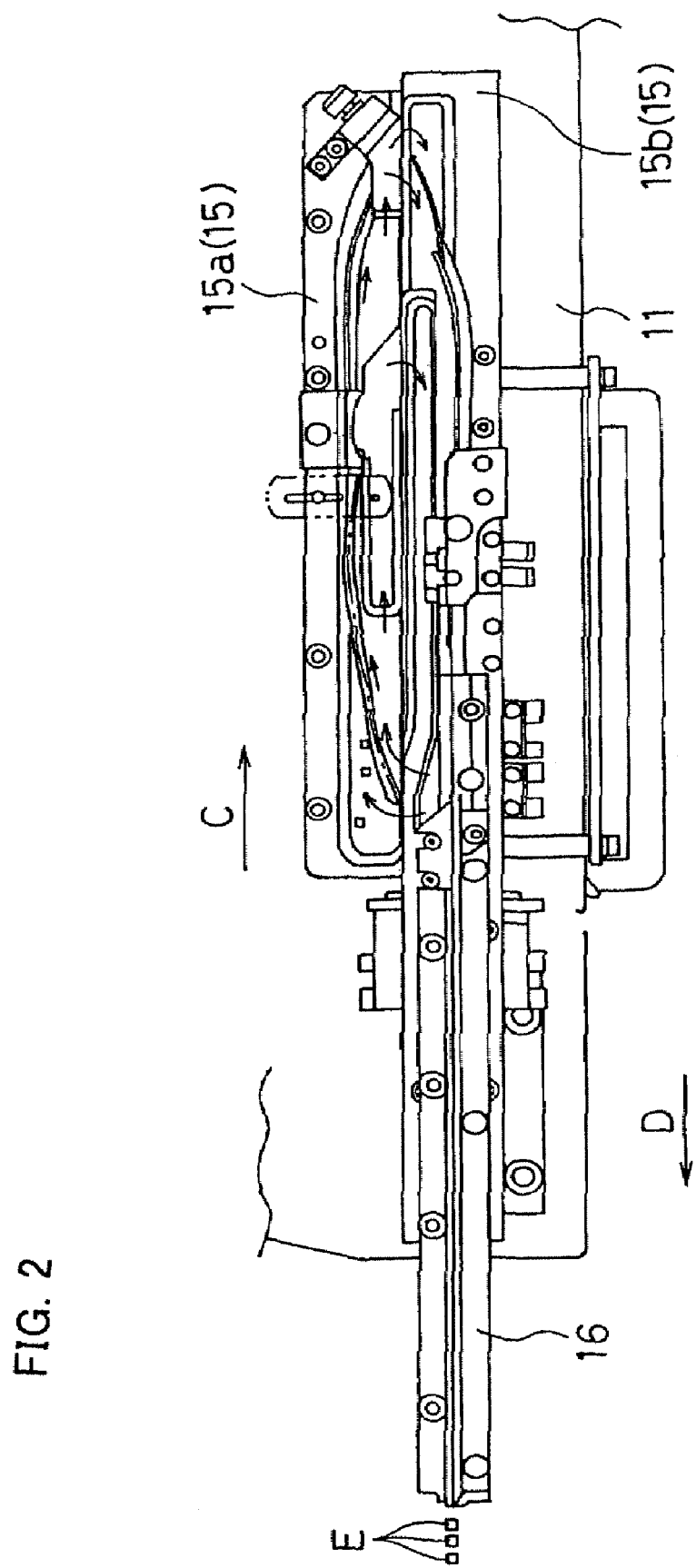
FIG. 2 is a top view of the piezo-driven parts feeder in FIG. 1.

FIG. 1 schematically illustrates a piezo-driven parts feeder 1 according to a first embodiment. FIG. 2 shows the piezo-driven parts feeder 1 in plan view. In the first embodiment, a linear parts feeder will be described by way of example which conveys parts to the following process by circulating the parts into alignment while linearly vibrating a parts conveying member (a trough or the like) having a linear parts conveying track.

As shown in FIG. 1, the piezo-driven parts feeder 1 includes a moving table 11, a fixed table 12, a vibration generator 13, and a support member 14.

Referring to FIG. 2, the moving table 11 supports a parts conveying member (trough) 15 having a parts conveying track (parts conveying path) (i.e., the trough 15 is secured to the upper surface of the moving table 11). The trough 15 shown in FIG. 2 includes a return trough 15a having a track that conveys parts along the arrow C for returning the parts and a main trough 15b having a track for conveying the parts in alignment along the arrow D. The parts put into the center of the trough 15 through a hopper (not shown) are conveyed in alignment while being returned on the trough 15, as shown by the arrow above the trough 15 in the drawing, and are supplied to the following process through a discharge chute 16 at the end of the main trough 15b, like parts E shown in the drawing.

As shown in FIG. 1, the fixed table 12 is disposed below the moving table 11 and supports the moving table 11 through the vibration generator 13 and the support member 14 so as to freely vibrate the moving table 11. The fixed table 12 is fixed to a base 17. In the center of the fixed table 12, space is formed for the vibration generator 13 to be arranged.

The vibration generator 13 is arranged at plural positions between the moving table 11 and the fixed table 12. Each of the vibration generators 13 includes a first elastic member 18 and a piezoelectric element 19 mounted to the first elastic member 18. The first elastic member 18 is constructed as a leaf spring 18 (hereinafter, also referred to as a "piezoelectric spring 18"). The spring constant of the piezoelectric spring 18 can be appropriately selected depending on conditions such as a desired resonance frequency.

One end (a first end) 18a of the piezoelectric spring 18 is fixed to the moving table 11, while the other end (a second end) 18b is fixed to the fixed table 12. In other words, the first end 18*a* is fixed to a mounting section 11*a* of the moving table 11 with a bolt or the like and the second end 18*b* is fixed to a mounting section 12*a* of the fixed table 12 with a bolt or the like.

The piezoelectric springs 18 are shaped like a flat plate and are inclined at the same angle. The vibration angle of the piezoelectric spring 18 can be controlled by varying the mounting angle. To change the mounting angle of the piezoelectric spring 18, the mounting section 11*a* and the mounting section 12*a* can be used as mounting-angle changers for changing the mounting angle of the piezoelectric spring 18 by making the mounting section 11*a* and the mounting section 12*a* of replaceable block members. In this case, the piezoelectric spring 18 can be arranged at a specified inclination angle by changing the mounting sections 11*a* and 12*a* serving as mounting-angle changers to ones each having a slope with a specified angle. Thus, the vibration angle can easily be changed to a desired angle by changing the mounting angle of the piezoelectric spring 18 with the mounting-angle changer.

Since the leaf spring 18 (first elastic member) can be freely replaced with a removable bolt or the like, it can be replaced with another leaf spring (another first elastic member) having a spring constant different from that of the leaf spring 18 before the replacement. Accordingly, the resonance frequency can easily be controlled into a desired value by replacing the leaf spring (piezoelectric spring) 18 in response to a desired resonance frequency. The piezoelectric spring 18 is not necessarily disposed one for each of the vibration generators 13 but multiple layers may be selected as appropriate.

The piezoelectric element 19 is constructed to have polarization potential: a positive polarity for one surface and a negative polarity for the other surface, by polarizing, e.g., piezoelectric ceramics. The piezoelectric element 19 is attached to the front and back of each piezoelectric spring 18 by bonding to thereby construct a bimorph element serving as the vibration generator 13. When a voltage having a specified frequency is applied to the piezoelectric element 19, the vibration generator 13 generates vibration to drive the piezo-driven parts feeder 1.

The support member 14 includes a second elastic member (leaf spring) 20 different from the first elastic member (leaf spring) 18. One end (a first end) 20*a* of the leaf spring 20 (hereinafter, also referred to as a "support spring 20") serving as the second elastic member is fixed to the moving table 11 through a mounting section, while the other end (a second end) 20*b* of the support spring 20 is fixed to the fixed table 12 through a mounting section. The first end 20*a* and the second end 20*b* are detachably attached to the moving table 11 and the fixed table 12 with bolts or the like, respectively.

The support spring 20 serving as the second elastic member is also shaped like a flat plate, like the leaf spring 18 serving as the first elastic member. The respective flat-plate parts of the support spring 20 and the piezoelectric spring 18 are arranged at an approximately equal angle with respect to the vertical direction (i.e., the support spring 20 and the piezoelectric spring 18 are arranged approximately in parallel in the piezo-driven parts feeder 1, or a linear parts feeder). Accordingly, the support spring 20 can easily be vibrated substantially in synchronization with the vibration of the piezoelectric spring 18 serving as a vibrator, so that the interference to the vibrating actions between the piezoelectric spring 18 and the support spring 20 can be reduced; thus, the vibration can be efficiently transmitted to the moving table 11.

With the piezo-driven parts feeder 1, as described above, the moving table 11 is supported by the fixed table 12 through the vibration generator 13 and the support member 14 which are mounted separately. Therefore, the height of the piezo-driven parts feeder 1 can be decreased by the adjustment of each height of the vibration generator 13 and the support member 14. In other words, an increase in height can be prevented, as in the piezo-driven parts feeder described in patent document 1 of the prior art.

The static load of the moving table 11 is supported in a dispersed manner by the vibration generators 13 and the support members 14 mounted at plural positions, so that a bending load occurring in the leaf springs 18 and 20 can be dispersed. Thus, the load due to the static load applied to the piezoelectric element mounted to the leaf spring 18 serving as the first elastic member can be restricted. Since the restriction on the vibrator mounting position, as in the piezo-driven parts feeder described in the patent document 2 of the prior art, is small, an excess tensile strength of the leaf spring 18 serving as the first elastic member can also be restricted.

The leaf spring 18 serving as the first elastic member and the leaf spring 20 serving as the second elastic member can easily be separately replaced, not taking a complicated labor for reassembly, which increases efficiency of replacement work. Application of a large load on an elastic member (leaf spring) that is not being replaced can be prevented during the replacement, so that a damage to the elastic member that is not being replaced can be prevented.

The case of vibrating the piezo-driven parts feeder 1 will next be described. In the piezo-driven parts feeder 1, the characteristic frequency (natural frequency) f determined by the moving table 11, the first elastic member 18, and the second elastic member 20 can be given by the equation (1)

$$f = (1/2\pi) \times \{(k_1 + k_2)/m_1\}^{1/2} \quad (1)$$

where $k_1$ is a spring constant of a total of the first elastic members 18 (the spring constant of a total of two sets of the piezoelectric springs 18 in the embodiment of FIG. 1), $k_2$ is the spring constant of a total of the second elastic members 20 (the spring constant of a total of two sets of the support springs 20 in the embodiment of FIG. 1), and $m_1$ is the mass of the moving table 11.

To drive the piezo-driven parts feeder 1, AC voltage having the same frequency as the characteristic frequency f determined by the equation (1) is applied to the piezoelectric element 19. Thus, the vibration generator 13 can resonate the piezo-driven parts feeder 1 at the characteristic frequency f. Accordingly, the characteristic frequency f can be set to various values and so the resonance frequency can be controlled finely in a wide range by combining the mass $m_1$ of the moving table 11 and the respective spring constants ($k_1$ and $k_2$) of the first and second elastic members. Also sufficient amplitude can be ensured by the resonance at the desired frequency.

Each piezoelectric element 19 is polarized so that when the voltage with the same frequency as the characteristic frequency f is applied to the piezoelectric element 19, one of the piezoelectric elements 19 bonded to the piezoelectric spring 18 extends, while the other piezoelectric element 19 contracts. Therefore, the piezoelectric spring 18 is vibrated (vibrates) so as to repeat a deflecting action with a specified frequency. The moving table 11 also vibrates with the vibration displacement of the first end 18*a* due to the vibration. Then the piezo-driven parts feeder 1 vibrates by the resonance at the characteristic frequency f determined by the equation (1) to thereby convey the parts on the parts conveying member.

With the piezo-driven parts feeder 1, the vibration generator 13 and the support member 14 are arranged separately. Therefore, a high resonance frequency can be achieved by setting the spring constant of the piezoelectric spring 18 of the vibration generator 13 small and adjusting the spring constants of the support springs 20 of the support members 14 by appropriately combining them. Accordingly, even during high-frequency driving, sufficient amplitude can be ensured and the stress to the vibration generator 13 can be restricted.

With the piezo-driven parts feeder 1, the resonance frequency for driving can easily be varied depending on the characteristic frequency f of the equation (1) by changing the number and the spring constants of the support springs 20. Furthermore, the resonance frequency can be finely adjusted to a desired value (a desired frequency for resonant vibration) by adjusting the respective spring constants of the piezoelectric springs 18 and the support springs 20 by combining them.

The invention can be applied not only to the linear parts feeder but also to a bowl parts feeder that conveys parts while vibrating a parts conveying member (bowl or the like) having a spiral parts conveying track to circulate the parts into alignment. When the invention is applied to the bowl parts feeder, the first elastic member and the second elastic member are disposed in, e.g., multiple positions in the vicinity of the moving table and the fixed table. In this case, the flat-plate parts of the first and second elastic members are preferably inclined at substantially equal angle with respect to the vertical direction. Consequently, the interference to the vibrating actions between the first elastic member and the second elastic member can be reduced; thus, the vibration can be efficiently transmitted to the moving table.

Second Embodiment

Figure 3:
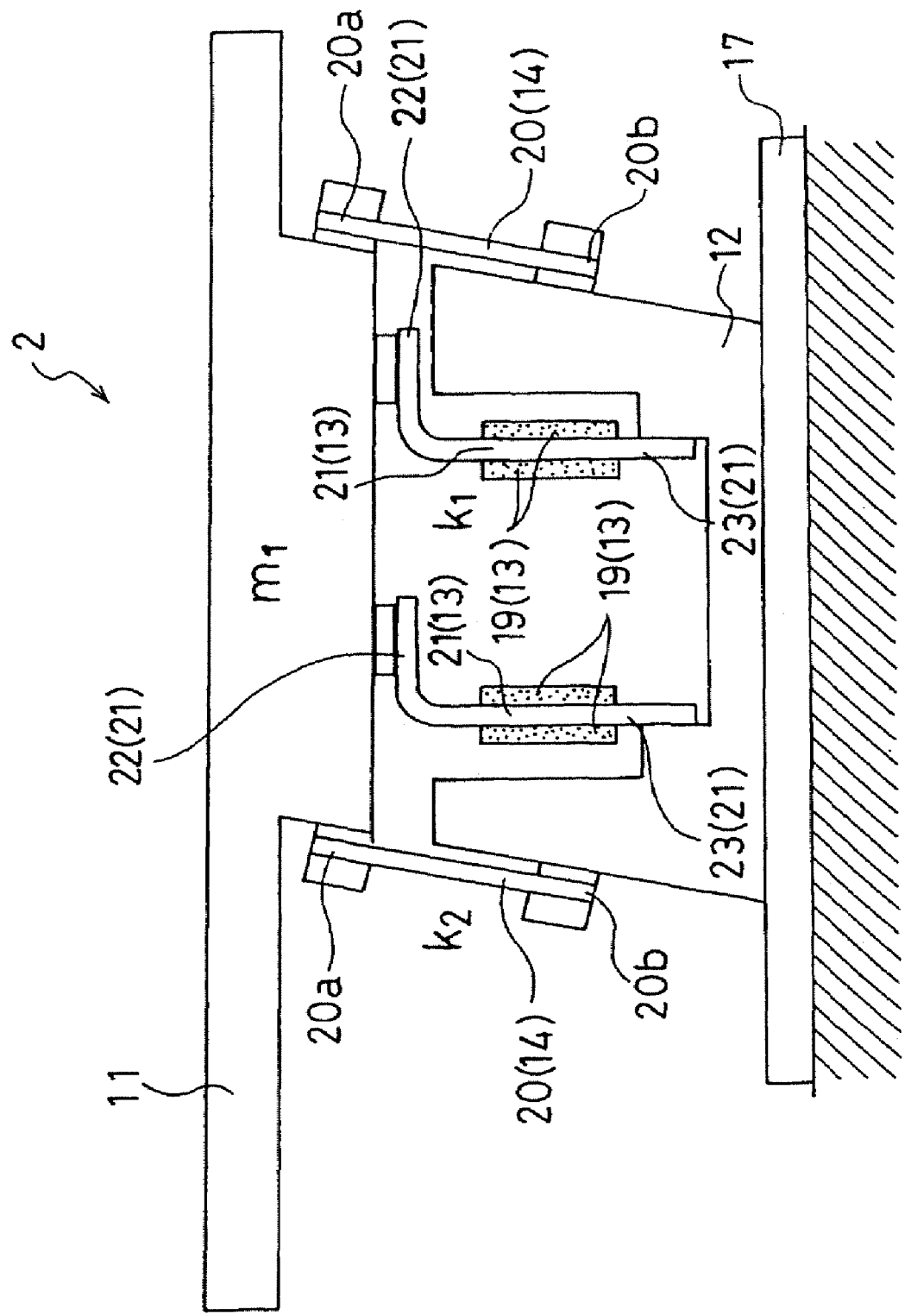
FIG. 3 is a schematic diagram illustrating a piezo-driven parts feeder according to a second embodiment of the present invention.
Figure 4:
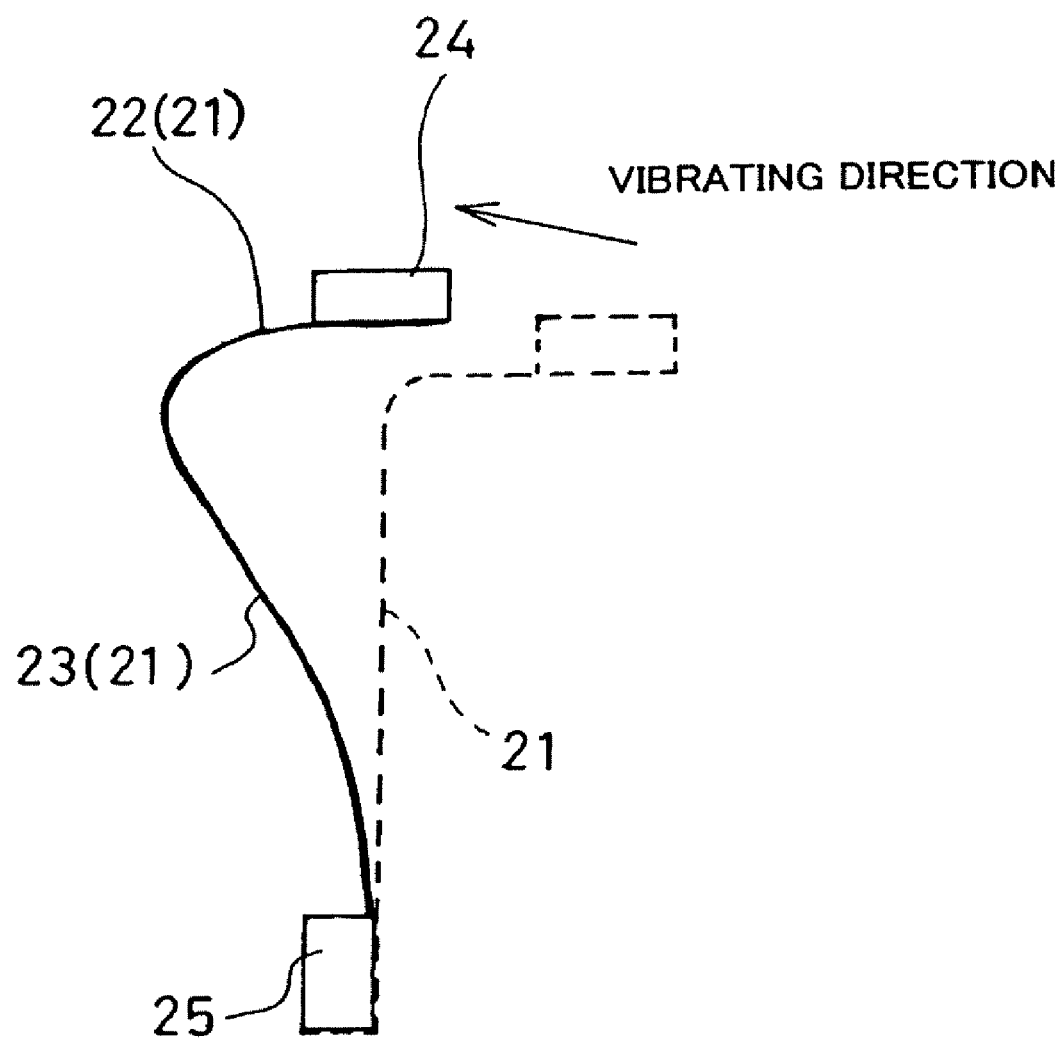
FIG. 4 is a schematic diagram illustrating the state of a piezoelectric spring during the vibration of the piezo-driven parts feeder in FIG. 3.

Referring to FIGS. 3 and 4, a piezo-driven parts feeder 2 according to a second embodiment will be described. An example of application to the linear parts feeder will be described with reference to the schematic diagram of the piezo-driven parts feeder 2 in FIG. 3. The elements of FIG. 3 similar to those of the piezo-driven parts feeder 1 according to the first embodiment are given the same numerals and their description will be omitted.

The piezo-driven parts feeder 2 has a similar structure to that of the piezo-driven parts feeder 1 but is different in the structure of a piezoelectric spring (leaf spring) 21 serving as a first elastic member. As shown in FIG. 3, the piezoelectric spring 21 in the piezo-driven parts feeder 2 is formed substantially in L-shape. One side (a first side) 22 of the L-shape is arranged substantially parallel to the moving table 11 and the fixed table 12, while the other side (a second side) 23 of the L-shape is mounted almost perpendicular to the lower surface of the moving table 11.

FIG. 4 schematically illustrates the state of the piezoelectric spring 21 during vibration, showing a state in which the first side 22 is fixed to a mounting section 24 of the moving table 11 and the end of the second side 23 is fixed to a mounting section 25 of the fixed table 12. As shown in the drawing, when voltage is applied to the piezoelectric element 19 to vibrate the piezoelectric spring 21, the vertical vibration of the moving table 11 is generated by the change of the angle of the corner of the L-shaped piezoelectric spring 21. Thus, since the angle of the L-shaped corner changes owing to the elastic deformation of the piezoelectric spring 21, the vibration can be efficiently transmitted to the moving table 11 even with a relatively small force.

With the piezo-driven parts feeder 2, the amplitude of the vibration is almost determined by the mounting angle of the support spring 20 serving as the second elastic member arranged outside. Accordingly, the amplitude of the vibration can be adjusted only by the mount adjustment of the support spring 20. Since the piezoelectric element 19 is mounted to the vertical first side 22, a bending stress due the static load is prevented from being applied to the mounting section of the piezoelectric element 19 of the piezoelectric spring 21. In other words, an excess load on the piezoelectric element 19 can be prevented.

Also the piezo-driven parts feeder 2 described above offers the similar advantages to those of the piezo-driven parts feeder 1 according to the first embodiment.

Third Embodiment

A piezo-driven parts feeder 3 according to a third embodiment will be described.

Figure 5:
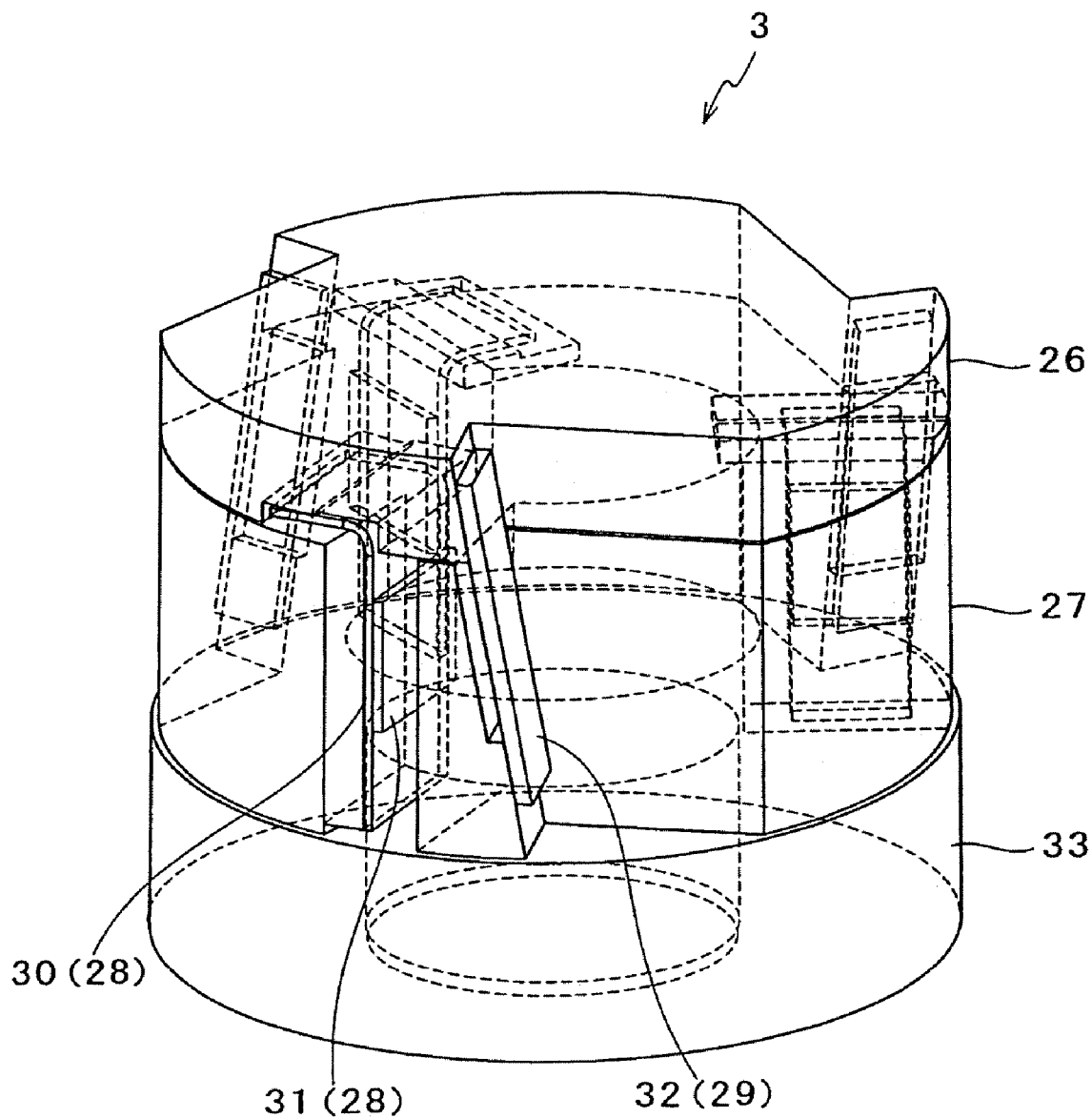
FIG. 5 is a schematic perspective view illustrating a piezo-driven parts feeder according to a third embodiment of the present invention.

FIG. 5 schematically shows the piezo-driven parts feeder 3 in perspective. The piezo-driven parts feeder 3 has the similar structure to that of the piezo-driven parts feeder 2 according to the second embodiment but is different in that it is applied to the bowl parts feeder, not to the linear parts feeder.

The piezo-driven parts feeder 3 includes a moving table 26, a fixed table 27, a vibration generator 28, and a support member 29. The vibration generator 28 has a piezoelectric spring 30 serving as a first elastic member and a piezoelectric element 31. The support member 29 has a support spring 32 serving as a second elastic member. The piezoelectric spring 30 is formed in L-shape and one side (a first side) of the L-shape is arranged approximately perpendicular to the moving table 11 and the fixed table 12, while the other side (a second side) is arranged almost in parallel to the moving table 11, as in the case of the piezo-driven parts feeder 2. On the moving table 11, a parts conveying member (a bowl or the like, not shown) having a spiral parts conveying track is mounted on the moving table 11. The fixed table 27 is fixed to a base 33. FIG. 5 shows other elastic members and so on in perspective.

With the piezo-driven parts feeder 3 constructed as a bowl parts feeder, the angle of the L-shaped corner is varied owing to the elastic deformation of the piezoelectric spring 30, so that the vibration can be efficiently transmitted to the moving table 26, as in the second embodiment.

Also the piezo-driven parts feeder 3 described above offers the similar advantages to those of the piezo-driven parts feeder 1 according to the first embodiment.

Fourth Embodiment

Figure 6:
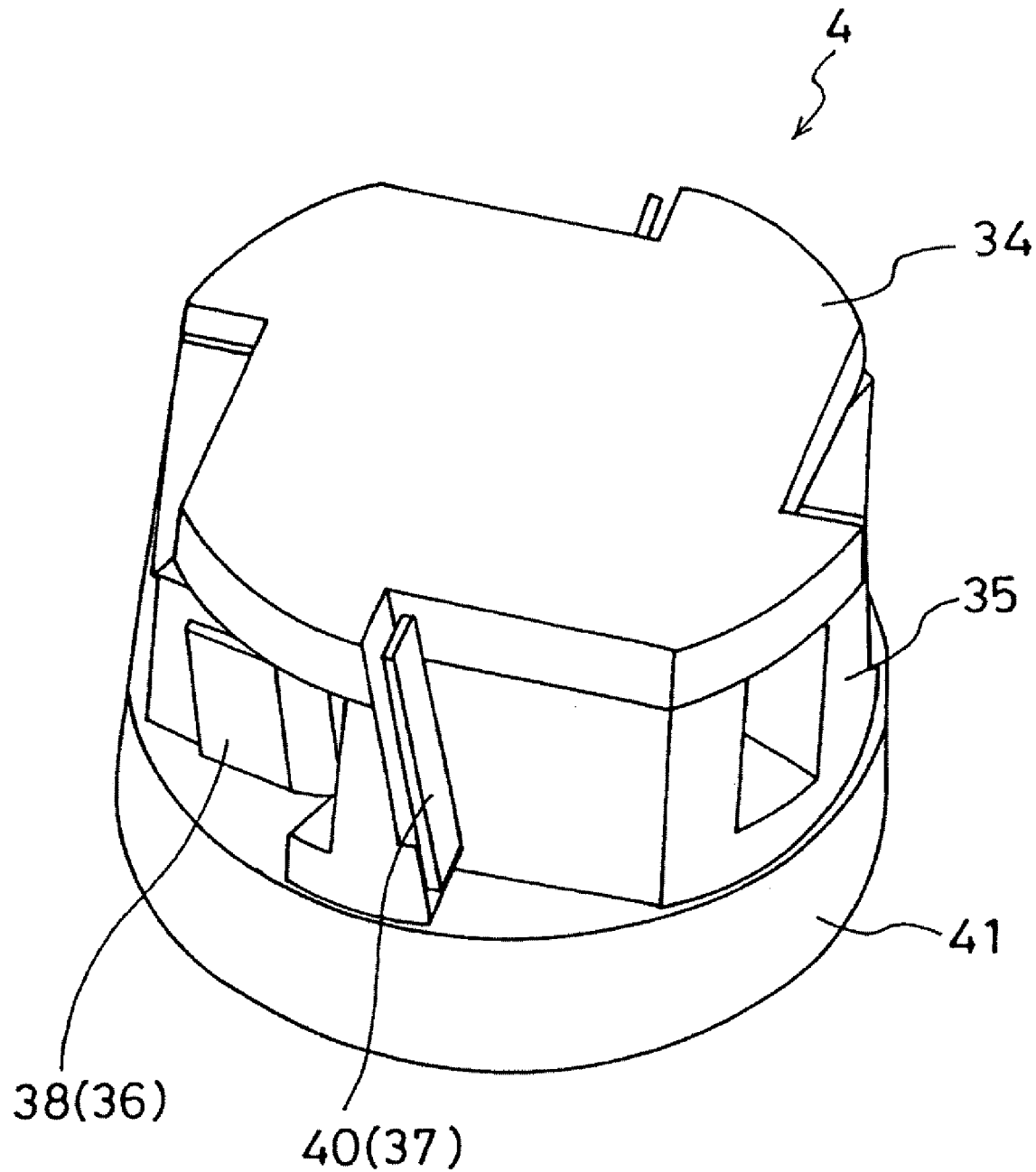
FIG. 6 is a perspective view illustrating a piezo-driven parts feeder according to a fourth embodiment of the present invention.
Figure 7:
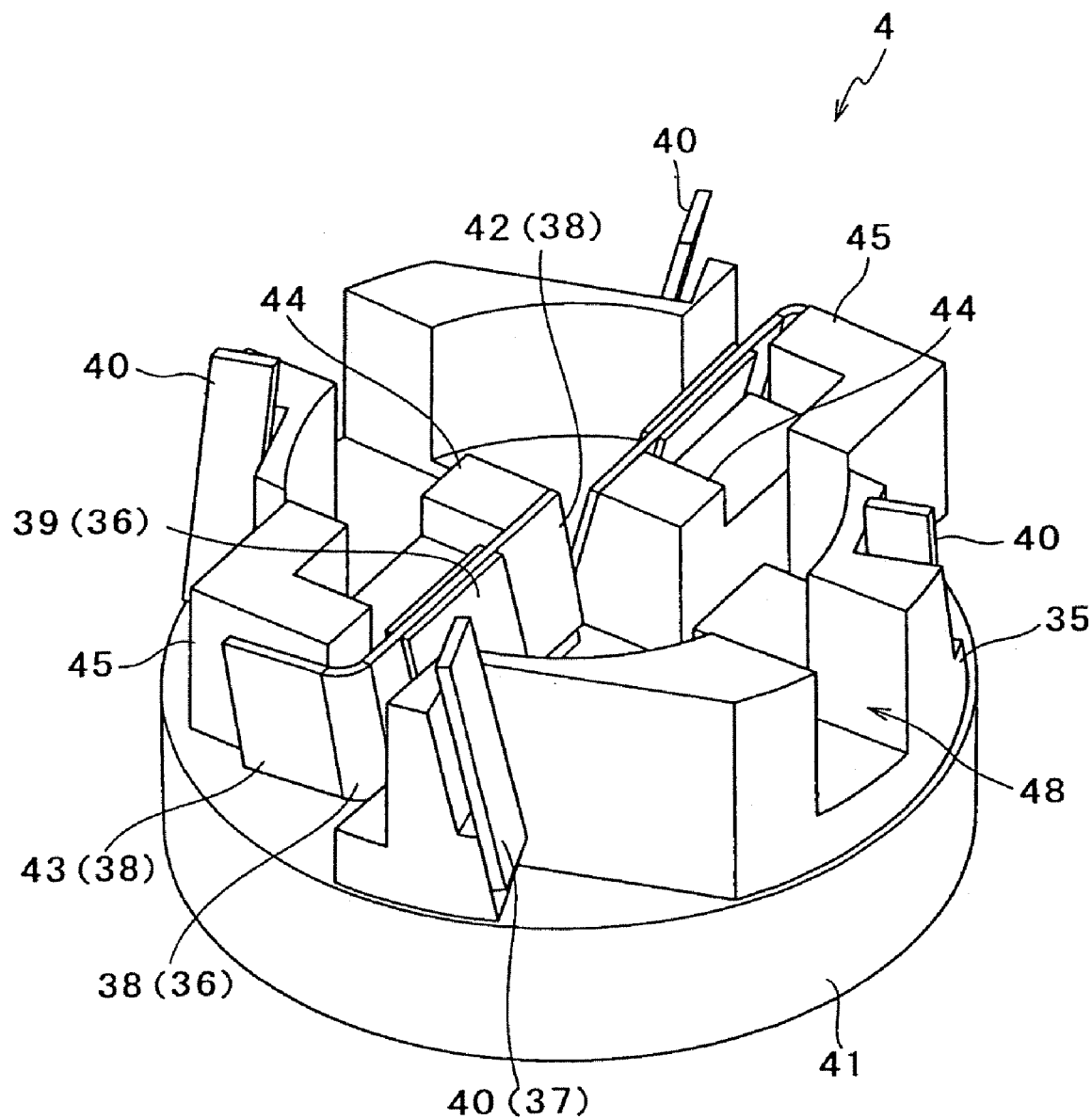
FIG. 7 is a perspective view of the piezo-driven parts feeder of FIG. 6 without a moving table.

Referring to FIGS. 6 to 12, a piezo-driven parts feeder 4 according to a fourth embodiment will be described. FIG. 6 shows the piezo-driven parts feeder 4 in perspective, showing a state in which the parts conveying member is not mounted. FIG. 7 shows the piezo-driven parts feeder 4 without a moving table 34 in perspective. The piezo-driven parts feeder 4 according to the fourth embodiment is constructed as a bowl parts feeder having a spiral parts conveying track.

The piezo-driven parts feeder 4, shown in FIGS. 6 and 7, includes the moving table 34, a fixed table 35, a vibration generator 36, and a support member 37. The vibration generator 36 has a piezoelectric spring 38 serving as a first elastic member and a piezoelectric element 39 mounted to the piezoelectric spring 38. The support member 37 has a support spring 40 serving as a second elastic member.

The support spring 40 is shaped like a flat plate and is arranged at four positions around the periphery of the piezo-driven parts feeder 4. One end of the support spring 40 is fixed to the moving table 34, while the other end is fixed to the fixed table 35. The fixed table 35 is secured to a base 41.

The piezoelectric spring 38 is formed substantially in L-shape and arranged almost horizontally between the moving table 34 and the fixed table 35. One side (a first side) 42 of the L-shape extends toward the center of the fixed table 35, the extending end being fixed to the fixed table 35 with a mounting section 44 (the mounting section 44 protruding upward in the center of the fixed table 35), while the other side (a second side) 43 of the L-shape is fixed to the moving table 34 with a mounting section 45 (the mounting section 45 protruding downward around the moving table 34).

Figure 8:
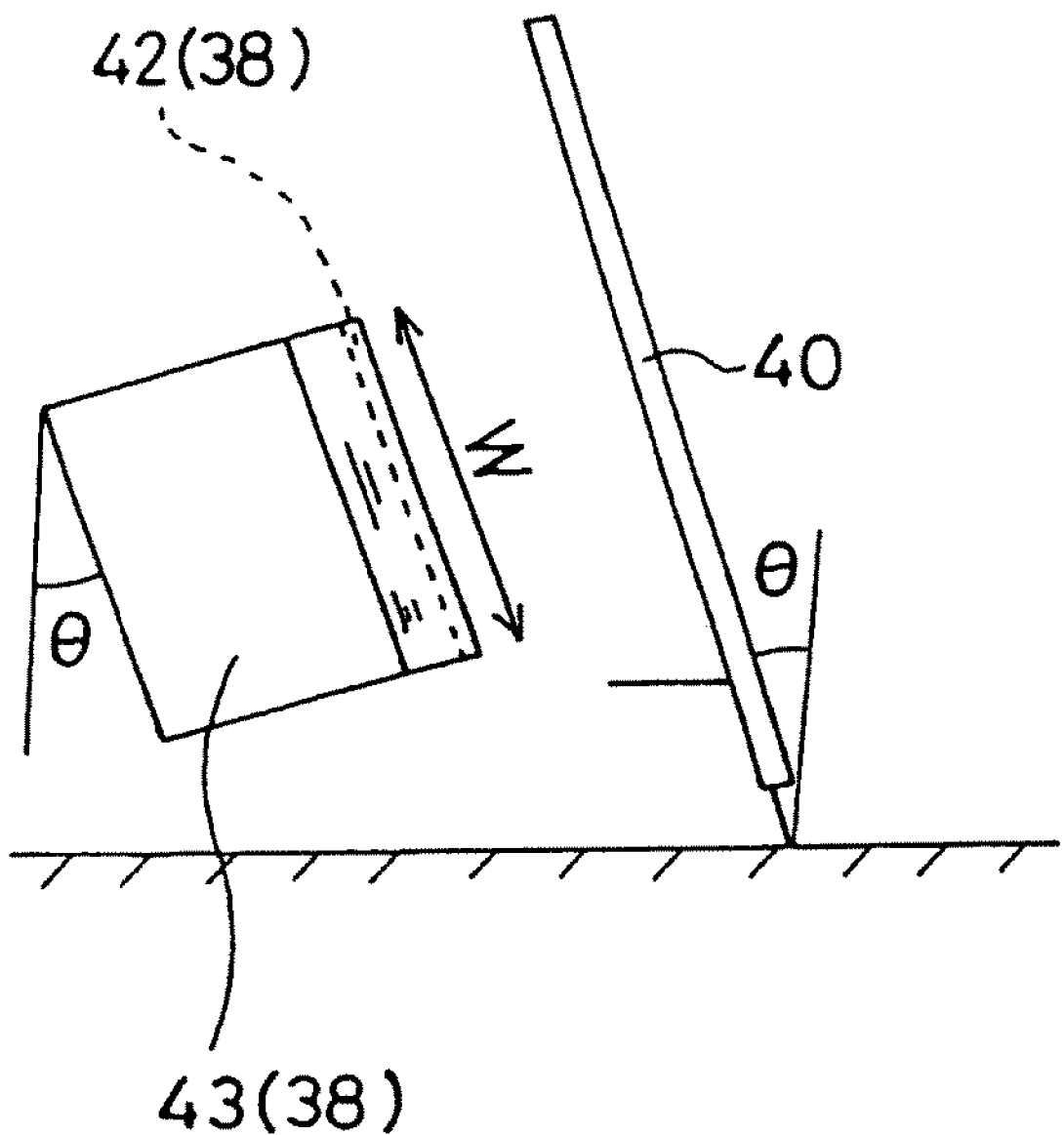
FIG. 8 is a schematic diagram illustrating the tilt angles of a piezoelectric spring and a support spring of the piezo-driven parts feeder in FIG. 6 with respect to a vertical direction.

The width of the first side 42 extending toward the center of the moving table 34 inclines with respect to the vertical direction at an approximately equal angle to that at which the support spring 40 inclines with respect to the vertical direction. FIG. 8 schematically illustrates the tilt angles of the piezoelectric spring 38 and the support spring 40 with respect to the vertical direction. The length of the support spring 40 inclines at an angle θ with respect to the vertical angle. The width of the first side 42 of the L-shape of the piezoelectric spring 38 (along the double-ended arrow W in the drawing) inclines at the angle θ equal to that of the support spring 40. Since the springs incline at an equal angle, the interference to the vibrating actions between the piezoelectric spring 38 and the support spring 40 can be reduced and so a torsion stress to the piezoelectric spring 38 can be reduced; thus, the vibration can be efficiently transmitted to the moving table 34.

With the piezo-driven parts feeder 4, since the piezoelectric spring 38 is arranged horizontally, the piezo-driven parts feeder 4 can be further reduced in height. Since the angle of the corner of the L-shaped piezoelectric spring 38 changes owing to its elastic deformation, the vibration can be transmitted to the moving table 34 smoothly and efficiently with a relatively small force.

Figure 9:
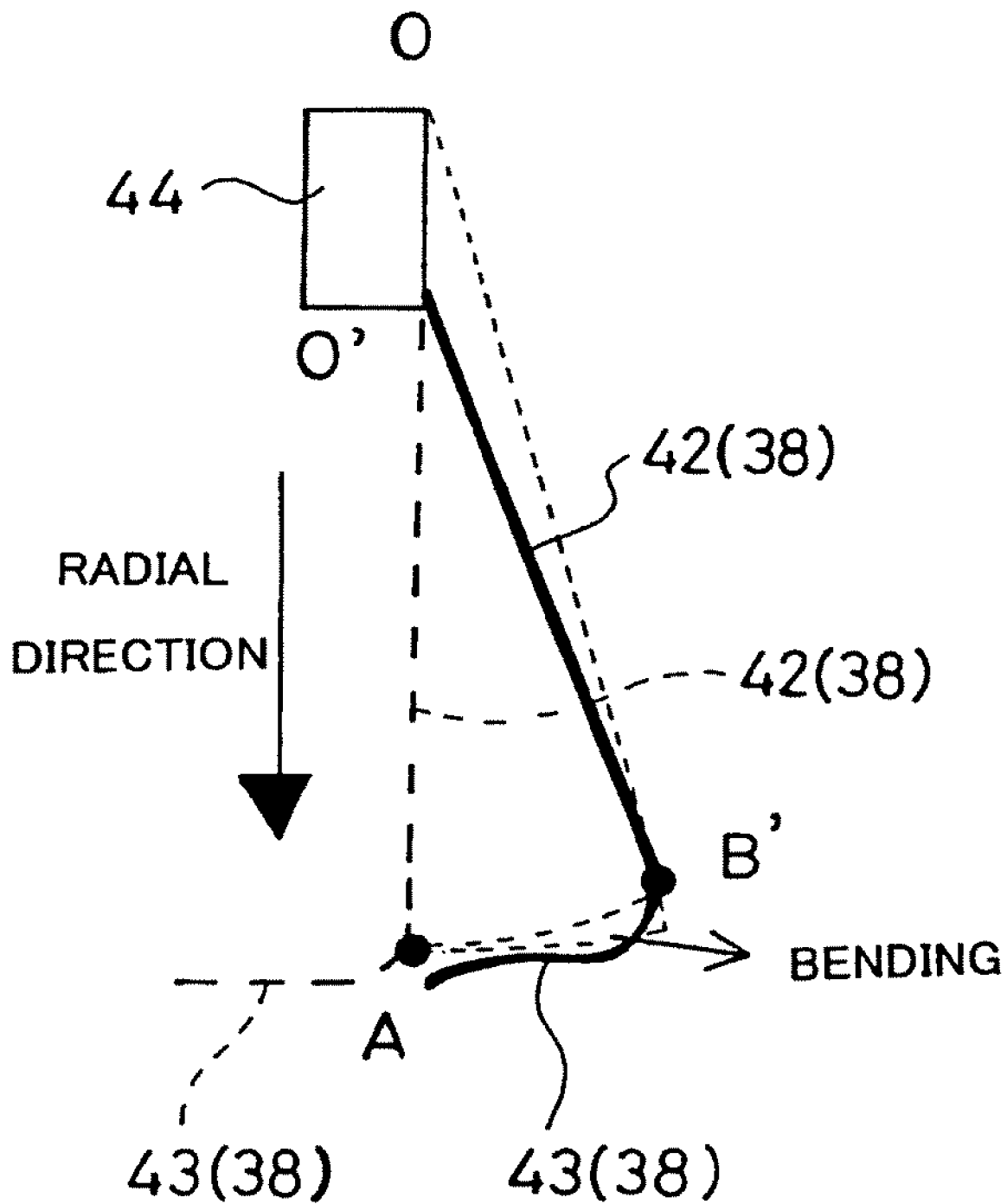
FIG. 9 is a schematic diagram illustrating a force applied to the piezoelectric spring during the vibration of the piezo-driven parts feeder in FIG. 6.

FIG. 9 schematically illustrates a force applied to the piezoelectric spring 38 during the vibration of the piezo-driven parts feeder 4. When the piezoelectric spring 38 vibrates, the end of the second side 43 of the piezoelectric spring 38 is going to shift from the point A to the point B' with the point O' as the center. At that time, the point A on the moving table 34 above the mounting position of the piezoelectric spring 38 is going to shift with the point O that is the center of the moving table 34 as the center. However, since the angle of the L-shaped corner changes, the gap between the rotation center of the moving table 34 and the mounting position of the piezoelectric spring 38 to the moving table 34 can be absorbed, so that an excess tensile stress is prevented from generating at the first side 42 of the piezoelectric spring 38 having the piezoelectric element 39 bonded thereto. Accordingly, an excess load on the piezoelectric element, as in the piezo-driven parts feeder described in the patent document 2 of the prior art, is prevented, so that a decrease in the life of the piezoelectric element can be prevented and also wasteful power consumption and reduction in efficiency can be prevented.

With the piezo-driven parts feeder 4, since the mounting position of the piezoelectric spring 38 to the fixed table 35 (i.e., the mounting position to the mounting section 44) is arranged in the center of the fixed table 35, the displacement of the piezoelectric spring 38 can be reduced, so that a bending stress to the piezoelectric spring 38 can be decreased.

FIGS. 10A and 10B schematically illustrate the displacement of the piezoelectric spring 38 due to the difference of the mounting position of the piezoelectric spring 38 to the fixed table 35. FIG. 10A shows an amplitude when the end of the first side 42 of the piezoelectric spring 38 is fixed in a position that almost agrees with the point O that is the center of the fixed table 35. FIG. 10B shows an amplitude when the end of the first side 42 of the piezoelectric spring 38 is fixed in a position apart from the point O. Both of FIGS. 10A and 10B show the case in which the length of the first side 42 of the piezoelectric spring 38 is r and a displacement L is produced around the circumference of the moving table 34. In FIG. 10B, the displacement L around the circumference of the moving table 34 is produced by the piezoelectric spring 38 being bent by angle $θ_2$. On the other hand, in FIG. 10A, the displacement L around the circumference of the moving table 34 can be produced merely by the piezoelectric spring 38 being bent by an angle $θ_1$ smaller than the angle $θ_2$. Accordingly, a specified displacement of the moving table 34 can be ensured by a small displacement of the piezoelectric spring 38 by providing the mounting position of the piezoelectric spring 38 to the fixed table 35 in the center of the fixed table 35. Thus, the bending stress that acts on the piezoelectric spring 38 can be reduced.

With the piezo-driven parts feeder 4, since the piezoelectric spring 38 is formed in L-shape, the stress to the piezoelectric spring can be reduced even with an equal efficient radius of the piezoelectric spring to produce the displacement around the circumference of the piezo-driven parts feeder, as compared with the simple flat-plate piezoelectric spring.

Figure 11A:
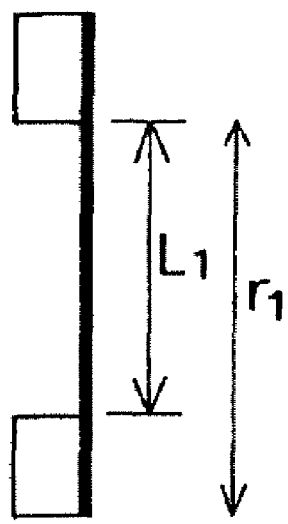
FIGS. 11A and 11B are schematic diagrams illustrating the difference in the stress that acts on the piezoelectric spring of the piezo-driven parts feeder in FIG. 6 between the case in which the piezoelectric spring is shaped like a flat plate (see FIG. 11A) and the case of L-shape (see FIG. 11B)
Figure 11B:
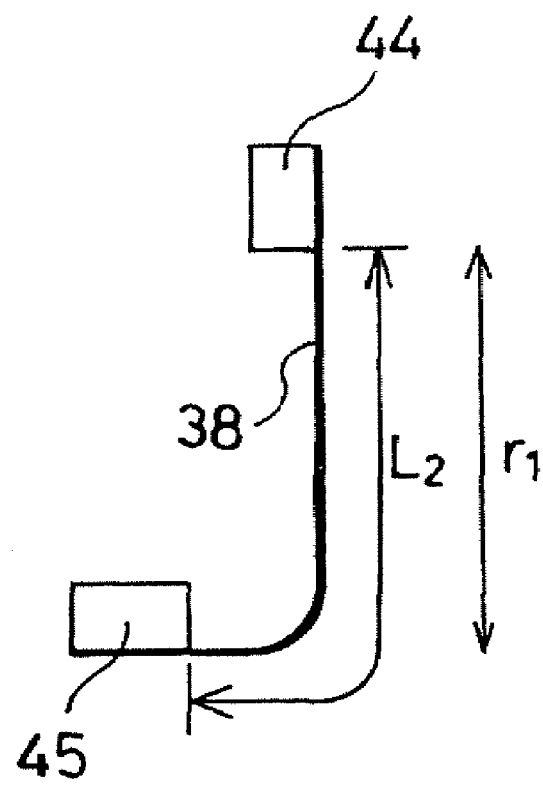

FIGS. 11A and 112B schematically illustrate the difference in the stress that acts on the piezoelectric spring between the case in which the piezoelectric spring is shaped like a flat plate (FIG. 11A) and the case of L-shape (FIG. 11B). The effective radius of the piezoelectric spring that causes a displacement along the circumference of the piezo-driven parts feeder is $r_1$ in both of FIGS. 11A and 11B. However, the distance along the piezoelectric spring between the mounting position of the moving table and the mounting position of the fixed table is different: $L_1$ for FIG. 11A and $L_2$ for FIG. 11B. Specifically, the effective length $L_2$ of the L-shaped piezoelectric spring 38 (FIG. 11B) between the mounting section 44 of the fixed table 35 and the mounting section 45 of the moving table 34 can be made longer than the effective length $L_1$ of the flat-plate piezoelectric spring (FIG. 11A).

In general, the maximum stress $σ_{max}$ that acts on the leaf spring can be given by the equation (2)

$$σ_{max}=(3·E·t·δ)/L_e^2 \qquad (2)$$

where Le is the effective length of the spring, δ is the maximum displacement of the spring, t is the thickness of the spring, and E is the Young's modulus of the spring.

Accordingly, with the L-shaped piezoelectric spring 38 having the spring effective length $L_e$ longer than that of the flat-plate piezoelectric spring (the effective length $L_1$ longer than $L_2$, shown in FIG. 11B), the stress that acts on the piezoelectric spring can be reduced even with an equal effective radius of the piezoelectric spring which produces the displacement around the circumference of the piezo-driven parts feeder, as expressed by the equation (2).

Figure 12:
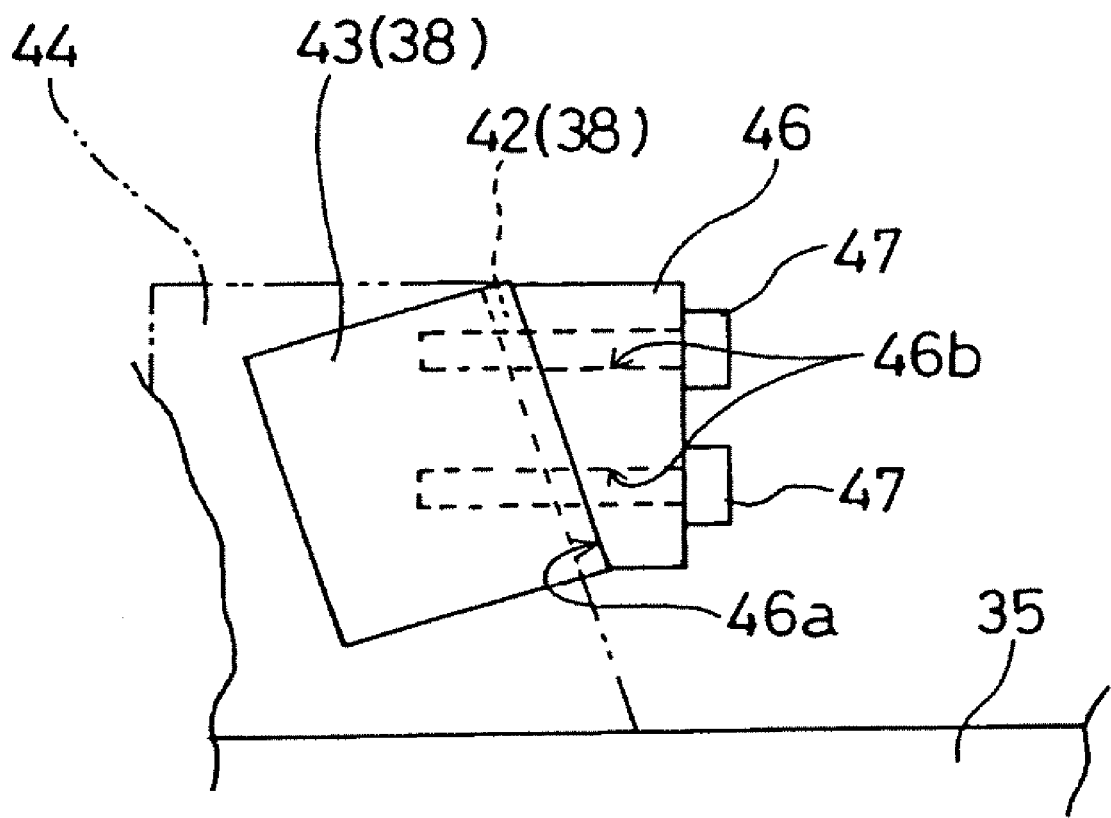
FIG. 12 is a schematic diagram of a modification of the mounting structure of the piezoelectric spring in the piezo-driven parts feeder of FIG. 6.

Referring to FIG. 12, with the piezo-driven parts feeder 4, the piezoelectric spring 38 may be mounted to the fixed table 35 through a spring holding member. FIG. 12 schematically illustrates the mounting structure of the piezoelectric spring 38 and a spring holding member 46. The first side 42 of the piezoelectric spring 38 may be mounted to the mounting section 44 of the fixed table 35 through the spring holding member 46 with mounting bolts 47. In this case, the spring holding member 46 has a slope 46a inclined with respect to the vertical direction at an angle equal to that of the piezoelectric spring 38 to be mounted and bolt holes 46b for the mounting bolts 47 to be screwed horizontally.

With this structure, the mounting bolts 47 for mounting the piezoelectric spring 38 to the fixed table 35 in the center of the piezo-driven parts feeder can be horizontally mounted and dismounted, thus facilitating the mounting and dismounting works for the piezoelectric spring 38. The mounting and dismounting of the mounting bolts 47 can be carried out by inserting a specified tool through a space 48 formed in the fixed table 35, as shown in FIG. 7. Since the mounting bolts 47 are provided horizontally, the piezoelectric spring 38 can be dismounted from the fixed table 35 from the exterior (e.g., through the space 48) without dismounting the moving table 34 from the piezoelectric spring 38 (the fixed table 35 can first be dismounted without the moving table 34 dismounted). This increases the flexibility of the piezoelectric-spring mounting and dismounting works, increasing work efficiency.

Also the above-described piezo-driven parts feeder 4 offers the similar advantages to those of the piezo-driven parts feeder 1 according to the first embodiment.

Fifth Embodiment

Figure 13:
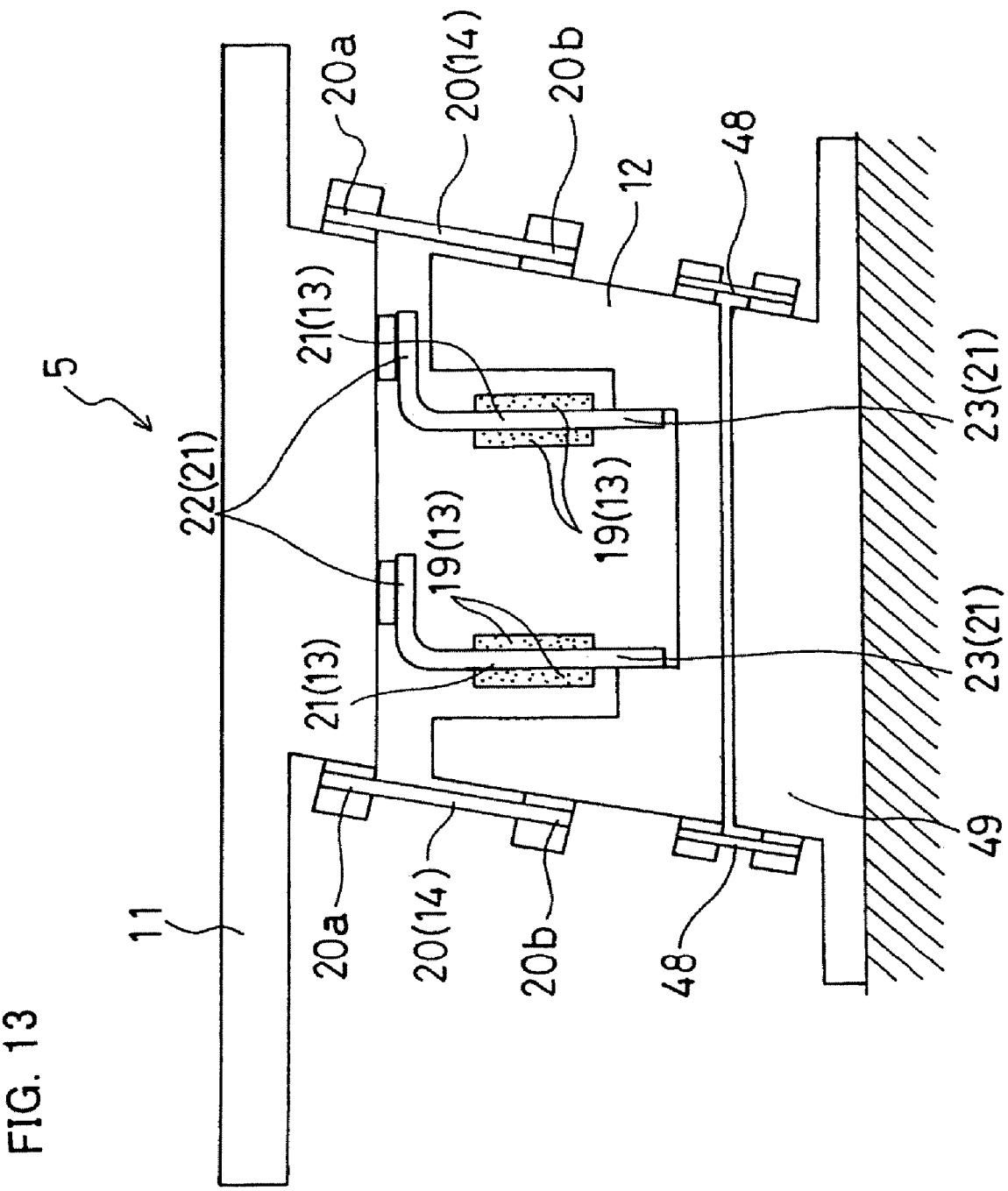
FIG. 13 is a schematic diagram illustrating a piezo-driven parts feeder according to a fifth embodiment of the present invention.

Referring to FIG. 13, a piezo-driven parts feeder 5 according to a fifth embodiment will be described. An example of application to the linear parts feeder will be described with reference to the schematic diagram of the piezo-driven parts feeder 5 in FIG. 13. The elements of FIG. 13 similar to those of the piezo-driven parts feeder 2 according to the second embodiment are given the same numerals and their description will be omitted.

The piezo-driven parts feeder S has a similar structure to that of the piezo-driven parts feeder 2 but is different in the structure in which the fixed table 12 is fixed to the base. With the piezo-driven parts feeder 5, the fixed table 12 is supported by a base 49 through a third elastic member 48 different from the first and second elastic members (20 and 21). In the embodiment of FIG. 13, a plurality of the third elastic members 48 are constructed as a leaf spring 48. The leaf spring 48 is selected and mounted having a spring constant smaller than any of the spring constants of the piezoelectric spring (first elastic member) 21 and the support spring (second elastic member) 20. Thus, the vibration transmitted from the fixed table 12 is absorbed by the leaf spring 48, so that the vibration transmitted from the fixed table 12 to the base 49 can be reduced.

The vibration absorption effect owing to the state in which the fixed table and the base are joined together with the third elastic member having a spring constant smaller than those of the first and second elastic members can also be applied to the piezo-driven parts feeders according to any of the first to fourth embodiments. The piezo-driven parts feeder 5 can produce the advantages similar to those of the piezo-driven parts feeder 2 according to the second embodiment.

Sixth Embodiment

Figure 14:
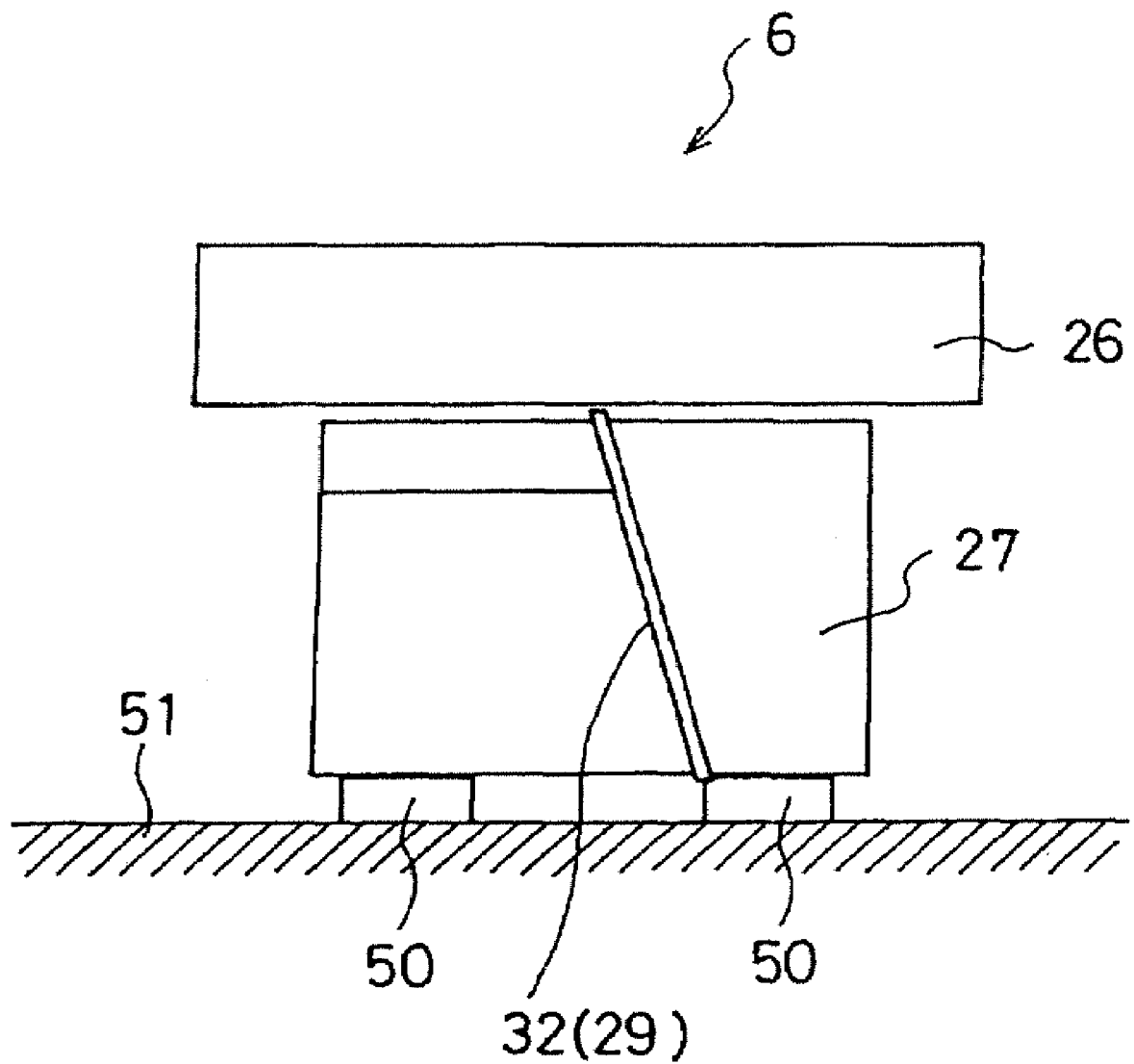
FIG. 14 is a side view illustrating a piezo-driven parts feeder according to a sixth embodiment of the present invention.

Referring to FIG. 14, a piezo-driven parts feeder 6 according to a sixth embodiment will be described. FIG. 14 illustrates the piezo-driven parts feeder 6 in side view which is applied to the bowl parts feeder.

The piezo-driven parts feeder 6 has a similar structure to that of the piezo-driven parts feeder 3 according to the third embodiment, whose elements similar to those of the piezo-driven parts feeder 3 are given the same numeral, but is different from the piezo-driven parts feeder 3 in the structure in which the fixed table 27 is fixed to the base. With the piezo-driven parts feeder 6, the fixed table 27 is fixed to a base 51 through a plurality of rubber members 50. Thus, the vibration transmitted from the fixed table 27 is absorbed by the rubber members 50, so that the vibration transmitted from the fixed table 27 to the base 51 can be reduced.

The vibration absorption effect owing to the state in which the fixed table and the base are joined together with the rubber members can also be applied to the piezo-driven parts feeders according to any of the first to fourth embodiments. The piezo-driven parts feeder 6 can produce the advantages similar to those of the piezo-driven parts feeder 3 according to the third embodiment.

Seventh Embodiment

Figure 15:
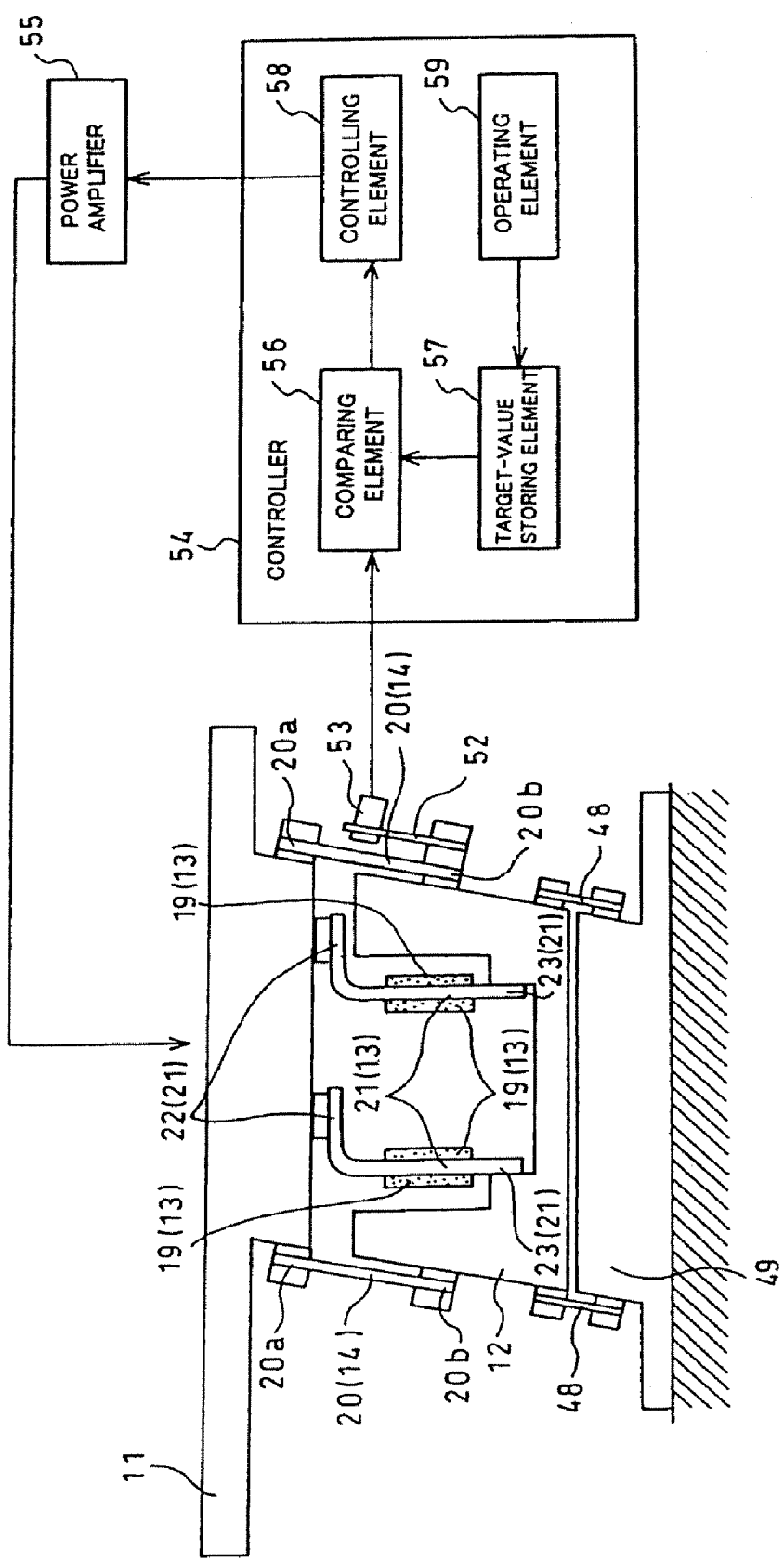
FIG. 15 is a schematic diagram illustrating a piezo-driven parts feeder according to a seventh embodiment of the present invention.
Figure 16:
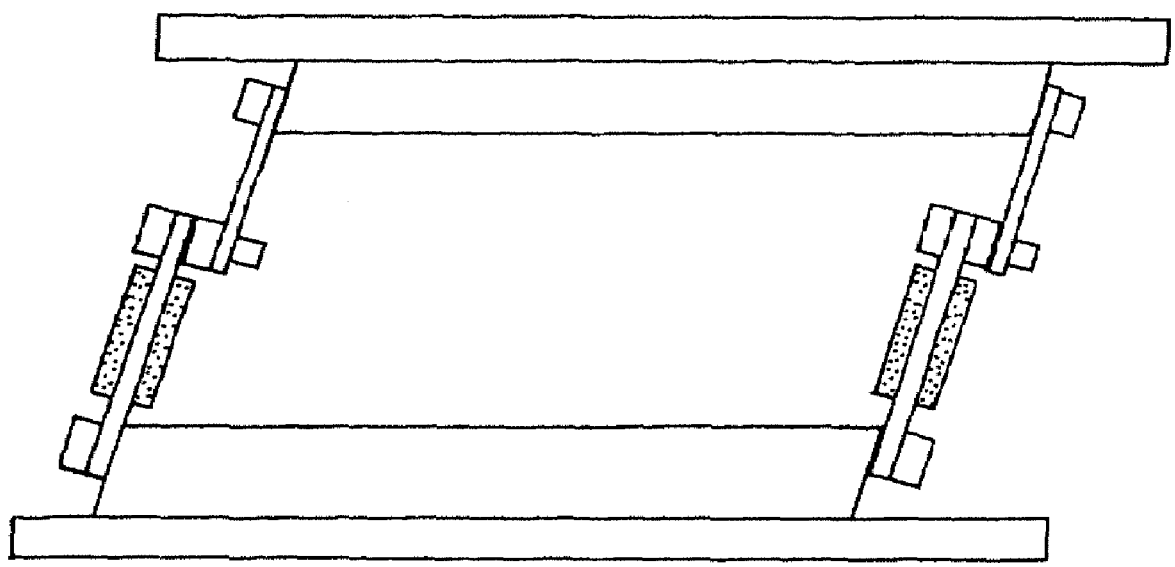
FIG. 16 is a schematic diagram of a piezo-driven parts feeder according to a prior art.
Figure 17:
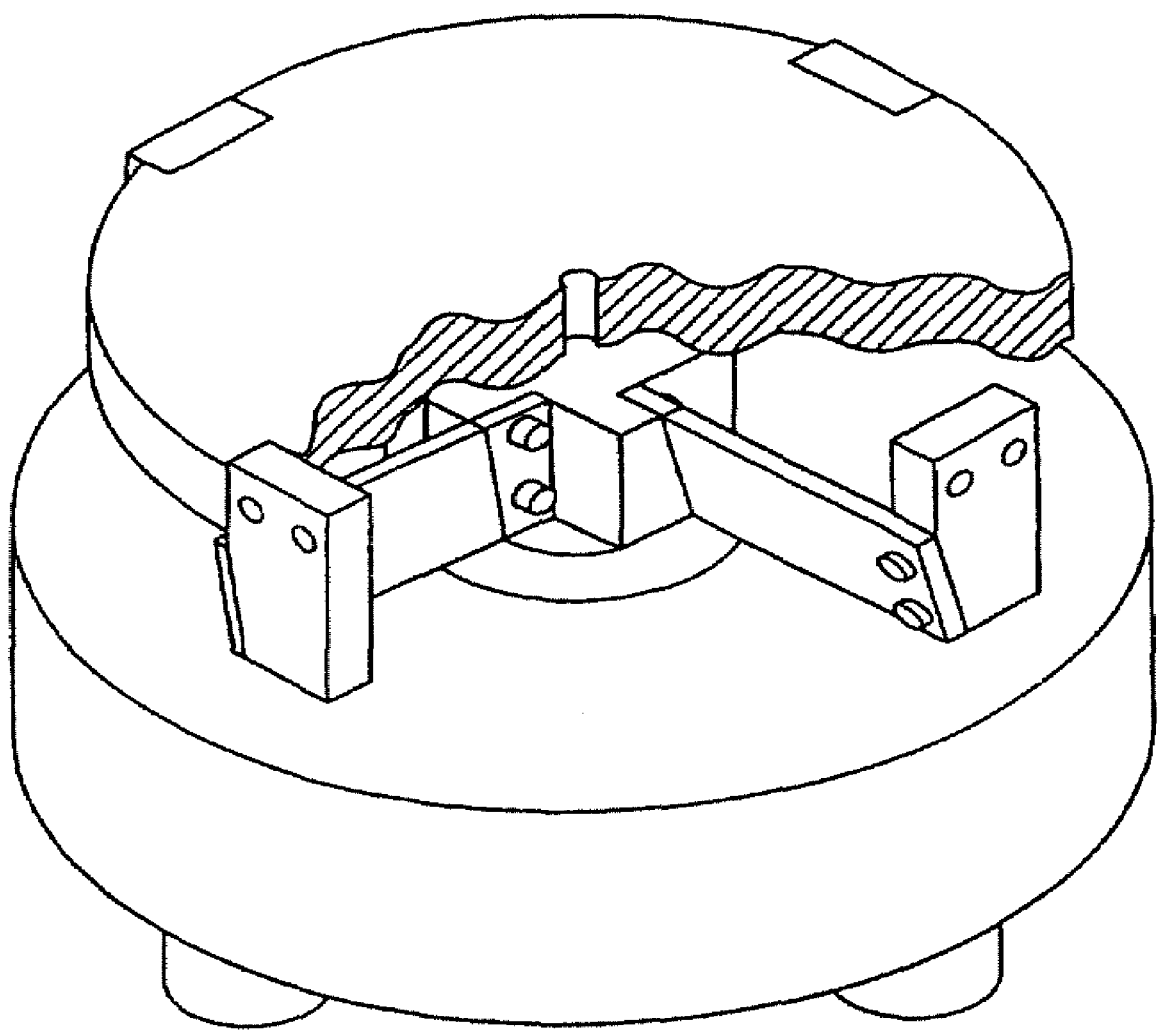
FIG. 17 is a perspective view of the piezo-driven parts feeder according to the prior art.
Figure 18:
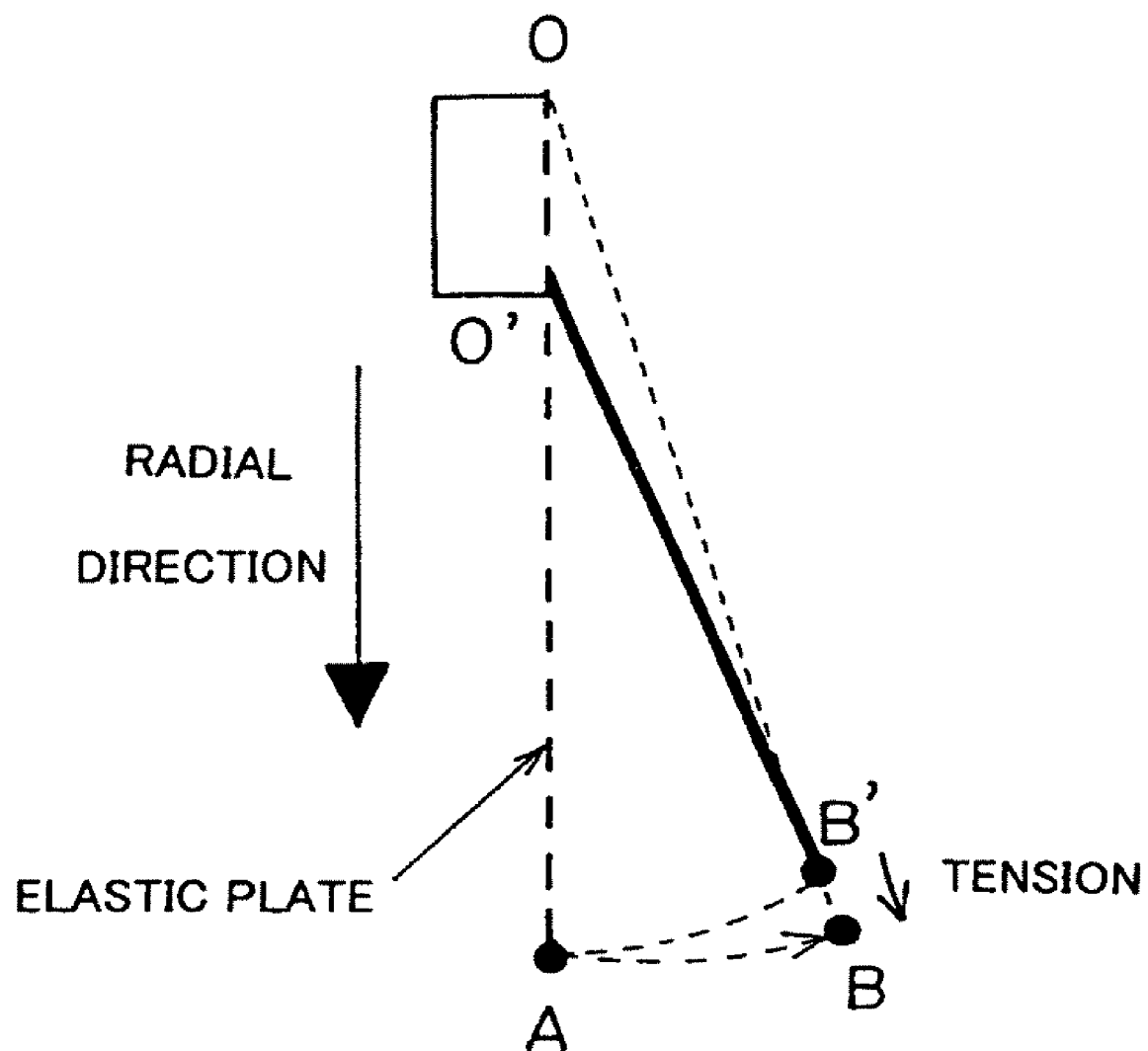
FIG. 18 is a schematic diagram illustrating a force applied to an elastic plate during the vibration of the piezo-driven parts feeder in FIG. 17.

Referring finally to FIG. 15, a piezo-driven parts feeder 7 according to a seventh embodiment will be described. FIG. 15 schematically illustrates the piezo-driven parts feeder 7 which is applied to the linear parts feeder by way of example. The elements of FIG. 15 similar to those of the piezo-driven parts feeder 5 according to the fifth embodiment are given the same numerals and their description will be omitted.

The piezo-driven parts feeder 7 has a similar structure to that of the piezo-driven parts feeder 5 but is different in that it includes a displacement sensor for determining the vibration displacement of the moving table 11 relative to the fixed table 12 and controls the drive frequency of the vibration generator on the basis of the determination of the displacement sensor.

Referring to FIG. 15, a displacement-sensor support member 52 is mounted to the second end 20b of one of the support springs 20 in the piezo-driven parts feeder 7. The support member 52 extends in the same direction as that of the support spring 20. At the distal end of the support member 5, a displacement sensor 53 is mounted, with which the distance between the mounting position of the displacement sensor 53 and the support spring 20 can be measured. Accordingly, when the piezo-driven parts feeder 7 vibrates, the first end 20a of the support spring 20 vibrates without the second end 20b moving with respect to the moving table 11, and so the aforesaid distance being measured varies with that, so that the vibration displacement of the moving table 11 relative to the fixed table 12 can be determined. The displacement that is measured directly by the displacement sensor 53 varies depending on the position of the displacement sensor 53 mounted to the support member 52. Therefore, it is preferable to mount the displacement sensor 53 as appropriate depending on the desired position for the vibration displacement of the moving table 11 relative to the fixed table 12. The vibration displacement of the moving table 11 relative to the fixed table 12 may be determined by operation of the dimensional condition and so on of the support spring 20 on the basis of the measurement by the displacement sensor 53.

The piezo-driven parts feeder 7 includes a controller 54 for controlling the drive frequency of the vibration generator 13 on the basis of the determination by the displacement sensor 53. The controller 54 is connected to the displacement sensor 53 so as to be able to receive the signal from the displacement sensor 53 and to be able to transmit a drive command to a power amplifier 55. The power amplifier 55 applies a voltage of a specified frequency and output to the piezoelectric element 19 in accordance with the command from the controller 54.

The controller 54 includes, as a hardware configuration, e.g., a central processing unit (CPU), a random access memory (RAM), a read only memory (ROM), an electrically erasable programmable read only memory (EEPROM), and an interface. These components are mutually connected on the bus.

The ROM is a read only memory which stores various programs used to control the operation of the piezo-driven parts feeder 7. The EEPROM is a readable and writable nonvolatile memory which stores various software including a program for allowing the piezo-driven parts feeder to work as the later-described piezo-driven parts feeder 7. The EEPROM also stores various data set through the input by an operator. The CPU performs various operations and processings on the basis of the received signals, the various programs and data in the ROM, the EEPROM, and the RAM, and also transmits and receives the signals through the interface. The RAM is a readable and writable volatile memory which stores various calculations and the like by the CPU. The interface allows the reception of the signal from the displacement sensor 53 and the transmission of the command to the power amplifier 55. The later-described elements (56 to 59) are constructed by the combination of the hardware and the software (refer to FIG. 15).

The controller 54 includes a comparing element 56, a target-value storing element 57, a controlling element 58, and an operating element 59, as shown in the functional block diagram of FIG. 15. The operating element 59 includes a control panel (not shown) which is capable of being inputted by the operator of the piezo-driven parts feeder 7, and so on. The operator operates the operating element 59 to input a desired driving condition for the piezo-driven parts feeder 7, i.e., the drive frequency or drive amplitude of vibration of the moving table 11 to the fixed table 12, thereby setting the desired driving condition.

The target-value storing element 57 stores the driving condition (the drive frequency or the drive amplitude) of the piezo-driven parts feeder 7 on the basis of the input by the operator through the operating element 59. The target-value storing element 57 is constructed by allocation of specified memory areas in the memories such as the RAM and the EEPROM.

The comparing element 56 compares the determination by the displacement sensor 53 with the set target value of the vibrating condition. In other words, it compares the signals received from the displacement sensor 53 with a target value stored in the target-value storing element 57. The comparing element 56 is achieved by the programs stored in the CPU and the ROM or the EEPROM.

The signals from the displacement sensor 53 include the actual value of the vibration frequency of the piezo-driven parts feeder 7 determined by the displacement sensor 53 (or a signal value capable of calculating it) and the actual value of the vibration amplitude of the piezo-driven parts feeder 7 (or a signal value capable of calculating it). The comparing element 56 compares the received vibration-frequency actual value with the drive-frequency set value (the specified resonance frequency set by the operator) stored in the target-value storing element 57 to find its deviation during the driving of the piezo-driven parts feeder 7. The comparing element 56 compares the received amplitude actual value with the drive-amplitude set value (a specified drive amplitude set by the operator) stored in the target-value storing element 57 to find its deviation.

The controlling element 58 issues a command for adjusting the drive frequency in accordance with the deviation between the vibration-frequency actual value and the drive-frequency set value, which is obtained by the comparing element 56, and transmits it to the power amplifier 55. The power amplifier 55 changes the frequency of the applied voltage of the piezoelectric element 19 in accordance with the drive-frequency command. The controlling element 58 issues a drive output command for adjusting the drive amplitude in accordance with the deviation between the amplitude actual value and the drive-amplitude set value, which is obtained by the comparing element 56, and transmits it to the power amplifier 55. The power amplifier 55 changes the output of the applied voltage of the piezoelectric element 19 in accordance with the drive output command. The controlling element 58 is achieved by the programs stored in the CPU and the ROM or the EEPROM.

With the above-described structure, the piezo-driven parts feeder 7 is capable of adjusting the drive frequency so that the vibration-frequency actual value determined by the displacement sensor 53 follows the set specified resonance frequency, thus performing feedback control. This allows automatic driving at a desired resonance frequency without the need for fine frequency adjustment and also allows power saving, leading efficient driving without waste. Feedback control can also be performed with the drive output controlled so that the amplitude actual value determined by the displacement sensor 53 converges to a specified amplitude. Consequently, constant amplitude control at a resonance frequency is always allowed irrespective of the change of the spring constants of the elastic members due to service condition and temperature and the mass of the moving table.

Also the above-described piezo-driven parts feeder 7 offers the similar advantages to those of the piezo-driven parts feeder 5 according to the fifth embodiment. The structure including the displacement sensor 53 and the controller 54 and its effects can also be applied to not only to the piezo-driven parts feeder 5 according to the fifth embodiment but also to the piezo-driven parts feeders according to any of the first to fourth and the sixth embodiments.

As described in the first to seventh embodiments, the piezo-driven parts feeder according to the invention allows the height of the piezo-driven parts feeder to be reduced, the stress that acts on the vibration generator to be restricted, ensures sufficient amplitude and allows the stress on the vibration generator to be restricted even during high-frequency driving, and facilitates the replacement of the vibration generator and the change and the adjustment of the resonance frequency.

While the preferred embodiments of the present invention have been described, it is to be understood that modifications, applications, and their equivalents to be clarified and involving the scope of the claims can be all made within the scope of the present invention.

For example, the following modifications may be made.

In the first to seventh embodiments, either of the parts conveying member (the trough, the bowl, or the like) integrated with the moving table and one supported separately by the moving table can offer the advantages of the invention.

In the first to seventh embodiments, not only the piezoelectric elements mounted to the front and back of the first elastic member but one mounted only to one side can offer the advantages of the invention.

In the first to seventh embodiments, the mounting positions and the mounting numbers of the vibration generators and the support members can be selected appropriately and can be set freely. The numbers of the first and second elastic members can also be selected appropriately and can be set freely.

In the first to seventh embodiments, the piezoelectric element mounted to the first elastic member may be constructed in either a single layer or multiple layers.

The first to seventh embodiments may be applied to a parts feeder that uses elliptical vibration in which parts are circulated into alignment by the torsional vibration of the parts conveying member (the bowl or the like).

The invention claimed is:

1. A piezo-driven parts feeder that conveys parts by generating vibration with a vibration generator including an elastic member having a piezoelectric element mounted thereto to align the parts, comprising:
    a moving table having or supporting the parts conveying member;
    a fixed table disposed below the moving table, for supporting the moving table so as to freely vibrate the moving table through the vibration generator;
    the vibration generator including a first elastic member and a piezoelectric element mounted to the first elastic member, one end of the first elastic member being fixed to the moving table and the other end of the first elastic member being fixed to the fixed table; and
    a support member including a second elastic member different from the first elastic member, one end of the second elastic member being fixed to the moving table and the other end of the second elastic member being fixed to the fixed table,
    wherein the first elastic member is formed approximately in L-shape;
    wherein one side of the L-shape is arranged almost perpendicularly to the moving table and the fixed table; and
    wherein the other side of the L-shape is arranged almost in parallel to the moving table and extends from the edge of the one side of the L-shape closest to the moving table so as to extend toward a predetermined direction.

2. A piezo-driven parts feeder according to claim 1, wherein the parts conveying track includes a linear part.

3. A piezo-driven parts feeder according to claim 1, wherein the parts conveying track includes a spiral part.

4. A piezo-driven parts feeder that conveys parts by generating vibration with a vibration generator including an elastic member having a piezoelectric element mounted thereto to align the parts, comprising:
    a moving table having or supporting the parts conveying member;
    a fixed table disposed below the moving table, for supporting the moving table so as to freely vibrate the moving table through the vibration generator;
    the vibration generator including a first elastic member and a piezoelectric element mounted to the first elastic member, one end of the first elastic member being fixed to the moving table and the other end of the first elastic member being fixed to the fixed table;
    a support member including a second elastic member different from the first elastic member, one end of the second elastic member being fixed to the moving table and the other end of the second elastic member being fixed to the fixed table;
    a displacement sensor for determining the vibration displacement of the moving table relative to the fixed table,
    wherein the drive frequency of the vibration generator is controlled in accordance with the determination by the displacement sensor,
    wherein the fixed table is supported by a base through a third elastic member, and
    wherein the spring constant of the third elastic member is smaller than either of the spring constants of the first elastic member and the second elastic member.

5. A piezo-driven parts feeder according to claim 4, wherein:
    the first elastic member comprise a elastic member formed approximately in L-shape;
    wherein one side of the L-shape is arranged almost perpendicularly to the moving table and the fixed table; and
    wherein the other side of the L-shape is arranged almost in parallel to the moving table and extends from the edge of the one side of the L-shape closest to the moving table so as to extend toward a predetermined direction.

6. A piezo-driven parts feeder that conveys parts by generating vibration with a vibration generator including an elastic member having a piezoelectric element mounted thereto to align the parts, comprising:
    a moving table having or supporting the parts conveying member;
    a fixed table disposed below the moving table, for supporting the moving table so as to freely vibrate the moving table through the vibration generator;
    the vibration generator including plural first elastic members and a piezoelectric element mounted to the at least one first elastic member, one end of each of the first elastic members being fixed to the moving table and the other end of each of the first elastic members being fixed to the fixed table; and
    a support member including a second elastic member different from the first elastic members, one end of the second elastic member being fixed to the moving table and the other end of the second elastic member being fixed to the fixed table,
    wherein the first elastic members are formed approximately in L-shape;
    wherein one side of the L-shape is arranged almost perpendicularly to the moving table and the fixed table; and
    wherein the other side of the L-shape is arranged almost in parallel to the moving table and, for all of said first elastic members, extends from the edge of the one side of the L-shape closest to the moving table so as to extend toward the conveying direction.

* * * * *